US012733667B2

(12) United States Patent
Hargreaves et al.

(10) Patent No.: US 12,733,667 B2
(45) Date of Patent: Sep. 15, 2026

(54) PROTEIN COMPOSITIONS PRODUCED FROM SUNFLOWER PLANT MATERIALS

(71) Applicant: BOTANECO INC., Calgary (CA)

(72) Inventors: Jason Hargreaves, Calgary (CA); Abhimanyu Jayakumar, Calgary (CA); Shuanghui Liu, Calgary (CA)

(73) Assignee: BOTANECO INC., Calgary (CA)

( * ) Notice: Subject to any disclaimer, the term of this patent is extended or adjusted under 35 U.S.C. 154(b) by 490 days.

(21) Appl. No.: 18/011,517

(22) PCT Filed: Jun. 18, 2021

(86) PCT No.: PCT/CA2021/050839
§ 371 (c)(1),
(2) Date: Dec. 19, 2022

(87) PCT Pub. No.: WO2021/253135
PCT Pub. Date: Dec. 23, 2021

(65) Prior Publication Data

US 2023/0148648 A1 May 18, 2023

Related U.S. Application Data

(60) Provisional application No. 63/041,350, filed on Jun. 19, 2020.

(51) Int. Cl.
*A23L 33/185* (2016.01)
*A23J 1/14* (2006.01)
*A23J 3/14* (2006.01)
*A23L 33/115* (2016.01)

(52) U.S. Cl.
CPC ............... *A23L 33/185* (2016.08); *A23J 1/14* (2013.01); *A23J 3/14* (2013.01); *A23L 33/115* (2016.08)

(58) Field of Classification Search
CPC .......... A23V 2250/54; A23V 2250/548; A23L 33/185; A23L 2/66; A23L 33/17; A23L 33/105; A23L 33/175; A23L 33/115; A23L 11/00; A23L 11/01
USPC .......................................... 426/656, 44, 598
See application file for complete search history.

(56) References Cited

U.S. PATENT DOCUMENTS

| | | | | |
|---|---|---|---|---|
| 4,889,921 A | 12/1989 | Diosady et al. | | |
| 6,426,110 B1 * | 7/2002 | Basa | A23C 11/08 | 426/657 |
| 2006/0182872 A1 * | 8/2006 | McCabe | A23L 25/10 | 426/656 |
| 2007/0207244 A1 | 9/2007 | Crank | | |
| 2010/0234569 A1 | 9/2010 | Helling et al. | | |
| 2015/0073127 A1 | 3/2015 | Wnukowski et al. | | |
| 2021/0153522 A1 | 5/2021 | Eisner | | |

FOREIGN PATENT DOCUMENTS

| | | |
|---|---|---|
| CA | 2645333 A1 | 9/2007 |
| CA | 2753440 A1 | 9/2010 |
| CA | 2880097 A1 | 2/2014 |
| CA | 3099360 A1 | 11/2019 |
| EP | 2498620 A1 | 9/2012 |
| RU | 2310335 C1 * | 11/2007 |
| WO | 2006/003110 A1 | 1/2006 |
| WO | 2016093698 | 8/2016 |
| WO | 2019048695 | 3/2019 |
| WO | 2019162440 | 8/2019 |
| WO | 2020/016222 A1 | 1/2020 |
| WO | 2022/058566 A1 | 3/2022 |

OTHER PUBLICATIONS

Lobanov, Vladimir Grigorevich et al. RU-2310335-C1, Machine Translation English, Nov. 20, 2007, pp. 1-4 (Year: 2007).*
International Search Report issued in Int'l Pat. App. No. PCT/CA2021/050839, mailed Aug. 30, 2021 (4 pp.).
Written Opinion of the International Searching Authority issued in Int'l Pat. App. No. PCT/CA2021/050839, completed Jul. 20, 2021 (7 pp.).
"International Search Report and Written Opinion of the International Searching Authority," issued in connection with Int'l Appl. No. PCT/CA2019/051893, dated Feb. 25, 2020 (9 pages).
"International Search Report and Written Opinion of the International Searching Authority," issued in connection with Int'l Appl. No. PCT/CA2021/050840, dated Aug. 25, 2021 (11 pages).

(Continued)

*Primary Examiner* — Hong T Yoo
(74) *Attorney, Agent, or Firm* — HOLLAND & HART LLP

(57) ABSTRACT

Disclosed are plant protein concentrates, extracts, and protein-lipid complexes prepared from sunflower plant material. Sunflower seeds are deconstructed and separated into heavy protein-rich fractions and light oil-rich fractions. The deconstruction processes avoid the use of organic solvents and temperatures above 60° C. The separated fractions are then selectively processed to produce selected plant protein compositions comprising from about 30% (w/w) to about 80% (w/w) sunflower protein, from about 1% (w/w) and to about 50% (w/w) plant oil, and up to about 25% (w/w) carbohydrates. The plant protein compositions from sunflower plants are suitable for use as ingredients in nutritional formulations.

10 Claims, 8 Drawing Sheets

(56) References Cited

OTHER PUBLICATIONS

European Patent Office, "Supplementary European search report," issued in connection with European Patent Application No. 19901130.5 dated Jul. 18, 2022 (9 pages).
Leonard, W., et al., "Hempseed in food industry: Nutritional value, health benefits, and industrial applications", Comprehensive Reviews in Food Science and Food Safety, vol. 19, No. 1, 2020, pp. 282-308.
Tan et al., "Canola Proteins for Human Consumption: Extraction, Profile, and Functional Properties", Journal of Food Science, vol. 76, No. 1, 2011, pp. R16-R28.
European Patent Application No. 21826485.1, Search Report dated Sep. 13, 2024; 10 pages.
Dorrell D G (1978), "Processing and Utilization of Oilseed Sunflower", Sunflower Science and Technology, XX, XX, No. 19, Jan. 1, 1978 (Jan. 1, 1978), pp. 407-440.

* cited by examiner

PROTEIN COMPOSITIONS PRODUCED FROM SUNFLOWER PLANT MATERIALS

CROSS-REFERENCE TO RELATED APPLICATIONS

This is a national phase application of International Application No. PCT/CA2021/050839, filed 18 Jun. 2021, which claims the benefit of U.S. Provisional Patent Application No. 63/041,350, filed 19 Jun. 2020, the disclosures of which are incorporated herein, in their entireties, by this reference.

FIELD OF THE DISCLOSURE

The present disclosure generally relates to protein preparations. More specifically, this disclosure pertains to protein-containing compositions, including protein concentrates, protein extracts and protein-lipid complex-containing mixtures, recoverable from plant components.

BACKGROUND

Plant materials are known to be excellent sources of edible oils and proteins. For example, edible oils are commonly produced by pressing under high pressures, seeds harvested from agricultural crops such as *Brassica* spp., corn, soybeans, peanuts, sunflower, safflower, hemp, flax, legumes, and cotton among others.

Plant materials with a high oil content (e.g. 35% or more) are typically processed with techniques that have evolved to optimize plant oil yield. In general, these processing techniques involve combinations of mechanical pressing and solvent extraction of selected plant material. After the oil is extracted, the remaining oilseed cake or meal may be used to extract plant proteins as a co-product. Protein extraction processes commonly involve heat treatment to remove extraction solvents from the oilseed cake or meal. However, due to the harsh processing conditions employed, the plant proteins recovered from oilseed cake or meal generally lose their native conformational state and form denatured or fractured structures. Preparations consisting primarily of denatured proteins are less suitable as nutritional ingredients, since properties such as solubility, flavor, smell, and color are generally all negatively impacted by the processing conditions.

Thus, it is clear that while plant materials represent a valuable source of proteins, the quality of protein preparations obtained from these plant materials known to the art is suboptimal.

SUMMARY

The embodiments of the present disclosure generally relate to protein preparations produced from selected sunflower plant materials. According to one aspect, the selected sunflower plant materials may be sunflower seeds.

One embodiment disclosed herein relates to sunflower protein compositions comprising from about 30% (w/w) to about 80% (w/w) sunflower protein, from about 1% (w/w) to about 50% (w/w) plant oil, and up to about 25% (w/w) carbohydrates.

According to one aspect, the sunflower protein compositions may comprise from about 34% (w/w) to about 78% (w/w) sunflower protein, from about 1% (w/w) to about 50% (w/w) plant oil, and up to about 22% (w/w) carbohydrates.

According to one aspect, the sunflower protein compositions may be sunflower protein concentrates comprising at least about 65% (w/w) sunflower protein, from about 1% (w/w) to about 12% (w/w) plant oil, and from about 5% (w/w) to about 15% carbohydrates.

According to another aspect, the sunflower protein concentrates may comprise 70% (w/w) or more sunflower protein.

According to another aspect, the sunflower protein concentrates may comprise 75% (w/w) or more sunflower protein.

According to another aspect, the sunflower protein compositions may be sunflower protein-lipid complex-containing mixtures comprising from about 32% (w/w) to about 39% (w/w) protein, from about 48% (w/w) to about 52% (w/w) plant oil, and from about 6.5% (w/w) to about 10.5% (w/w) carbohydrates.

According to another aspect, the sunflower protein compositions may be sunflower protein-lipid complex-containing mixtures comprising about 34% protein, about 50% (w/w) plant oil, and about 8.5% (w/w) carbohydrates.

According to another aspect, the sunflower protein compositions may be protein extracts comprising from about 50% (w/w) to about 65% (w/w) protein, from about 10% (w/w) to about 50% (w/w) plant oil, and from about 15% (w/w), to about 22% (w/w) carbohydrates.

According to another aspect, the protein extracts may comprise from about 50% (w/w) to about 55% (w/w) protein, from about 13% (w/w) to about 37% (w/w) plant oil, and up to about 22% (w/w) carbohydrates.

According to another aspect, the total protein and plant oil content of the sunflower protein compositions may range from about 66% to about 91%, and wherein the ratio of protein to oil may range from about 0.7:1 to about 66:1 on a weight-by-weight basis.

According to another aspect, the sunflower protein compositions may be sunflower protein concentrates comprising a total protein and plant oil content of at least about 69% (w/w).

According to another aspect, the sunflower protein compositions may be sunflower protein concentrates comprising a total protein and plant oil content of from about 68% (w/w) to about 70% (w/w.

According to another aspect, the sunflower protein compositions may be sunflower protein extracts comprising a total protein and plant oil content from about 66% (w/w) to about 91% (w/w).

According to another aspect, the sunflower protein compositions may be sunflower protein-lipid complex-containing mixtures comprising a total protein and plant oil content of about 84% (w/w).

According to another aspect, the sunflower protein compositions may be sunflower protein concentrates, wherein the ratio of protein to oil is at least about 5.5:1 on a weight-by-weight basis.

According to another aspect, the sunflower protein compositions may be sunflower protein concentrates, wherein the ratio of protein to oil is at least about 5.5:1 to about 66:1 on a weight-by-weight basis.

According to another aspect, the sunflower protein compositions may be sunflower protein-lipid complex-containing mixtures, wherein the ratio of protein to oil is about 0.7:1 on a weight-by-weight basis.

According to another aspect, the sunflower protein compositions may be sunflower extracts, wherein the ratio of protein to oil is at least about 1.4:1 up to about 4.2:1 on a weight-by-weight basis.

According to another aspect, the sunflower protein compositions may be sunflower protein extracts, wherein the weight percentage of essential amino acids in the sunflower protein extracts may be from about 30% (w/w) to about 36% (w/w) by weight protein.

According to another aspect, the sunflower protein compositions may be sunflower protein concentrates, wherein the weight percentage of essential amino acids in the sunflower protein concentrates may be about 29% (w/w) or more by weight protein.

According to yet another aspect, the sunflower protein compositions may be sunflower protein concentrates, wherein the lysine content may be up to about 4.4% by weight of crude protein of the sunflower protein concentrates.

According to yet another aspect, the sunflower protein compositions may be sunflower protein concentrates, wherein the lysine content may be up to at least 3.0% to about 5.2% by weight of crude protein of the sunflower protein concentrates.

Another embodiment disclosed herein relates to methods of making sunflower protein compositions, comprising the steps of:

(i) providing whole dehulled seeds from a sunflower plant;

(ii) comminuting the seeds in an aqueous solution to obtain a mixture comprising comminuted seed particles having mean particle sizes in a range of about 5 μm to about 200 μm; and (I)

(iii) separating the mixture into a solid phase and a liquid phase; and (iv) separating the liquid phase into an oleosome-containing light liquid phase and a heavy liquid phase;

and at least one of:

(A)

(v) treating the heavy liquid phase by microfiltration to recover therefrom a permeate;

(vi) treating the permeate by ultrafiltration to recover therefrom the protein retentate; and (vii) drying the protein retentate to obtain a first protein concentrate;

or (B)

(viii) precipitating the heavy liquid phase to obtain a protein precipitate and a liquid protein solution;

(ix) drying the protein retentate to obtain a second protein concentrate;

or (C) performing steps (A) (v) and (A) (vi) and step (B) (viii) and and at least one of:

(a)

(x) drying the protein precipitate and the protein retentate to obtain a first and second protein concentrate; and (xi) blending the first and second protein concentrate to obtain a third protein concentrate;

or (b)

(xii) blending the protein precipitate and the protein retentate to obtain a protein blend; and (xiii) drying the protein blend to obtain a fourth protein concentrate;

or (D)

(xiv) washing the oleosome-containing light liquid phase in a washing solution and separating a washed oleosome-containing light liquid phase from a protein-lipid complex-containing heavy phase;

(xv) combining the protein-lipid complex-containing heavy phase with the heavy liquid phase obtained in step (iv) to obtain a protein-lipid complex phase;

(xvi) treating the protein-lipid complex phase by microfiltration to recover therefrom a permeate;

(xv) treating the permeate by ultrafiltration to recover therefrom the protein retentate; and (xvi) drying the protein retentate to obtain a protein-lipid complex-containing mixture;

or (II)

(xvii) acidifying the mixture comprising comminuted seed particles to obtain an acidified comminuted seed particle mixture;

(xviii) separating the acidifier comminuted seed particle mixture into a solid phase and a liquid phase;

(xix) alkalizing the liquid phase to obtain an alkalized liquid phase; and (xx) separating the alkalized liquid phase into an oleosome-containing light liquid phase and a heavy liquid phase;

and at least one of:

(E)

(xxi) treating the heavy liquid phase by microfiltration to recover therefrom a permeate;

(xxii) treating the permeate by ultrafiltration to recover therefrom the protein retentate; and (xxiii) drying the protein retentate to obtain a first protein extract;

or (F)

(xxiv) precipitating the heavy liquid phase to obtain a protein precipitate and a liquid protein solution; and (xxv) drying the precipitate to obtain a second protein extract.

Another embodiment disclosed herein relates to methods of making sunflower protein concentrates, comprising the steps of:

(i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) separating the mixture into a solid phase and a liquid phase;

(iv) separating the liquid phase into an oleosome-containing light liquid phase and a heavy liquid phase;

(v) treating the heavy liquid phase by microfiltration to recover therefrom a permeate;

(vi) treating the permeate by ultrafiltration to recover therefrom the protein retentate; and (vii) drying the protein retentate to obtain a protein concentrate.

Another embodiment disclosed herein relates to methods of making sunflower protein concentrates, comprising the steps of:

(i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) separating the mixture into a solid phase and a liquid phase;

(iv) separating the liquid phase into an oleosome-containing light liquid phase and a heavy liquid phase;

(v) precipitating the heavy liquid phase to recover therefrom a protein precipitate;

(vi) drying the protein precipitate to obtain a protein concentrate.

Another embodiment disclosed herein relates to methods of making sunflower protein concentrates, comprising the steps of:

(i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) separating the mixture into a solid phase and a liquid phase; and (iv) separating the liquid phase into an oleosome-containing light liquid phase and a heavy liquid phase;

(v) precipitating the heavy liquid phase to obtain a protein precipitate and a liquid protein solution; and (vi) treating the liquid protein solution by ultrafiltration to obtain a retentate;

and at least one of:

(a)

(vii) drying the protein precipitate and the protein retentate to obtain a first and second protein concentrate; and (viii) blending the first and second protein concentrate to obtain a third protein concentrate;

or (b)

(ix) blending the protein precipitate and the protein retentate to obtain a protein blend; and (x) drying the protein blend to obtain a fourth protein concentrate.

Another embodiment disclosed herein relates to methods of making sunflower protein extracts, comprising the steps of (i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) acidifying the mixture comprising comminuted seed particles to obtain an acidified comminuted seed particle mixture;

(iv) separating the acidified comminuted seed particle mixture into a solid phase and a liquid phase;

(v) alkalizing the liquid phase to obtain an alkalized liquid phase;

(vi) separating the alkalized liquid phase into an oleosome-containing light liquid phase and a heavy liquid phase;

(vii) treating the heavy liquid phase by microfiltration to recover therefrom a permeate;

(viii) treating the permeate by ultrafiltration to recover therefrom the protein retentate; and (ix) drying the protein retentate to obtain a protein extract.

Another embodiment disclosed herein relates to methods of making sunflower protein extracts, comprising the steps of (i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) acidifying the mixture comprising comminuted seed particles to obtain an acidified comminuted seed particle mixture;

(iv) separating the acidified comminuted seed particle mixture into a solid phase and a liquid phase;

(v) alkalizing the liquid phase to obtain an alkalized liquid phase;

(vi) separating the alkalized liquid phase into an oleosome-containing light liquid phase and a heavy liquid phase;

(vii) precipitating the heavy liquid phase to recover therefrom a protein precipitate; and (viii) drying the protein precipitate to obtain a protein concentrate.

Another embodiment disclosed herein relates to methods of making sunflower protein-lipid complex-containing mixtures, comprising the steps of:

(i) providing whole dehulled seeds from a sunflower plant;

(ii) comminuting the seeds in an aqueous solution to obtain a mixture comprising comminuted seed particles having mean particle sizes in a range of about 5 μm to about 200 μm;

(iii) separating the mixture into a solid phase and a liquid phase;

and (iv) separating the liquid phase into an oleosome-containing light liquid phase and a heavy liquid phase;

(xxi) washing the oleosome-containing light liquid phase in a washing solution and separating a washed oleosome-containing light liquid phase from a protein-lipid complex-containing heavy phase;

(vi) combining the protein-lipid complex-containing heavy phase with the heavy liquid phase obtained in step (iv) to obtain a protein-lipid complex phase;

(vii) treating the protein-lipid complex phase by microfiltration to recover therefrom a permeate;

(viii) treating the permeate by ultrafiltration to recover therefrom the protein retentate; and (ix) drying the protein retentate to obtain a protein-lipid complex-containing mixture.

Another embodiment disclosed herein relates to methods of preparing nutritional formulations, the methods comprising:

(i) providing a sunflower protein composition produced by any one of the methods disclosed herein, said sunflower protein composition comprising from about 30% (w/w) to about 80% (w/w) sunflower protein, from about 1% (w/w) to about 50% (w/w) plant oil, and up to about 25% (w/w) carbohydrates;

(ii) providing a formulary ingredient suitable for inclusion in a nutritional formulation; and (iii) blending together the sunflower plant protein composition with the formulary ingredient to form a nutritional formulation comprising the sunflower protein composition disclosed herein.

Another embodiment of the present disclosure relates to a nutritional formulation comprising a sunflower protein composition comprising at least from about 34% (w/w) to about 80% (w/w) plant protein, from about 1% (w/w) to about 50% (w/w) plant oil, up to about 25% (w/w) carbohydrates, the balance of the sunflower protein composition substantially being constituted by water and ash.

Another embodiment of the present disclosure relates to a use of a sunflower protein composition as an ingredient for preparing a nutritional formulation, wherein the sunflower protein composition comprises from about 34% (w/w) to about 80% (w/w) protein, from about 1% (w/w) to about 12% (w/w) plant oil, up to about 25% (w/w) carbohydrates, the balance of the sunflower protein composition substantially being constituted by water and ash.

Other features and advantages of the present disclosure will become apparent from the following detailed description. It should be understood, however, that the detailed description, while indicating preferred implementations of the present disclosure, is given by way of illustration only, since various changes and modifications within the spirit and scope of the disclosure will become apparent to those of skill in the art from the detailed description.

BRIEF DESCRIPTION OF THE DRAWINGS

These and other features of the disclosure will become more apparent in the following detailed description in which reference is made to the appended drawings. The figures are provided herein for a better understanding of the example embodiments and to show more clearly how the various example embodiments may be carried into effect. The figures are not intended to limit the present disclosure.

Figure 1:
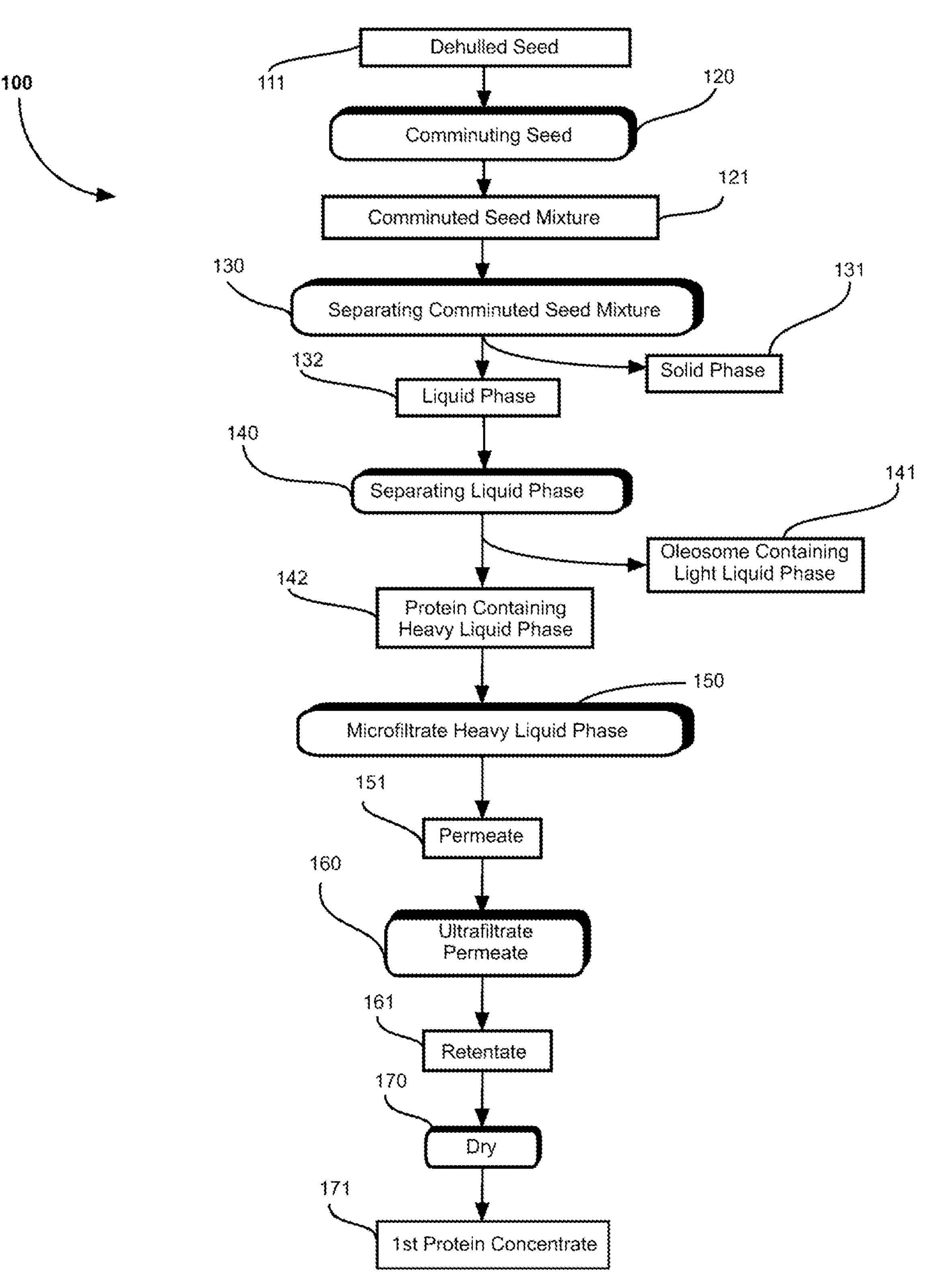
FIG. 1 is a schematic block diagram illustrating an example process 100 according to an example of an embodiment of the present disclosure, for making plant protein concentrates.

The figures together with the following detailed description makes apparent to those of skill in the art how the disclosure may be implemented in practice.

DETAILED DESCRIPTION

As used herein and in the claims, the singular forms, such as "a", "an" and "the" include the plural reference and vice versa unless the context clearly indicates otherwise. Throughout this specification, unless otherwise indicated, "comprise," "comprises" and "comprising" are used inclusively rather than exclusively, so that a stated integer or group of integers may include one or more other non-stated integers or groups of integers. The term "or" is inclusive unless modified, for example, by "either". The term "and/or" is intended to represent an inclusive or. That is "X and/or Y" is intended to mean X or Y or both, for example. As a further example, X, Y and/or Z is intended to mean X or Y or Z or any combination thereof.

When ranges are used herein for physical properties such as molecular weights, chemical properties, chemical formulae, and the like, all combinations and sub-combinations of ranges and specific embodiments therein are intended to be included. Other than in the operating examples or where otherwise indicated, all numbers expressing quantities of ingredients or reaction conditions used herein should be understood as modified in all instances by the term "about." The term "about" when referring to a number or a numerical range means that the number or numerical range referred to is an approximation within experimental variability (or within statistical experimental error), and thus the number or numerical range may vary between 1% and 15% of the stated number or numerical range, as will be readily recognized by the context. Furthermore, any range of values described herein is intended to specifically include the limiting values of the range, and any intermediate value or sub-range within the given range, and all such intermediate values and sub-ranges are individually and specifically disclosed (e.g. a range of 1 to 5 includes 1, 5, and all values therebetween). Similarly, other terms of degree such as "substantially" and "approximately" as used herein mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with the formulations described herein shall have the meanings that are commonly understood by those of ordinary skill in the art. The terminology used herein is for the purpose of describing particular embodiments only and is not intended to limit the scope of the present disclosure, which is defined solely by the claims.

All publications, patents, and patent applications referred herein are herein incorporated by reference in their entirety to the same extent as if each individual publication, patent or patent application was specifically indicated to be incorporated by reference in its entirety.

The term "sunflower" as used herein, refers to a plant belonging to the species *Helianthus annuus*, and further includes all species, subspecies, cultivars, varieties, hybrids, and genotypes.

The term "essential amino acids" as used herein, refers to histidine, isoleucine, leucine, lysine, methionine, phenylalanine, threonine, tryptophan, and valine. It is noted that in at least some fish species including without limitation salmon, arginine may additionally be considered an essential amino acid.

The term "comminuting" as used herein, refers to a process for deconstructing plant material into particles having sizes in a range from about 5 μm to about 200 μm and therebetween. Examples of comminuting processes include wet milling, grinding, homogenization, and the like. Suitable comminuting equipment includes a seed mill, a colloid mill, a hammer mill, a blade mill, a roller mill, and the like.

The phrase "formulating the protein composition to form a nutritional product" as used herein, refers to mixing or blending a protein composition produced by the methods disclosed herein, at least one other ingredient suitable for inclusion in a nutritional product.

The term "protein concentrate", as used herein, refers to a composition comprising at least 65% (w/w) protein, less than 90% (w/w) protein, and less than 20% (w/w) plant oil.

The term "protein extract", as used herein, refers to a composition comprising at least 50% (w/w) protein and less than 65% (w/w) protein.

The term "protein-lipid complex-containing mixture", as used herein, refers to a composition comprising at least 40% plant oil and at least 30% protein.

It is noted that reference may be made herein to various percentages of protein to quantify the amount of protein which may be present in a sample or composition. Such percentages may be expressed as a percentage of the total weight of the sample or composition, for example, 90% (w/w). Those skilled in this art will understand that the protein content in a preparation produced as disclosed herein, can readily be measured by various methodologies known to the art including, for example among others, the Kjeldahl method, or methods for determining measuring nitrogen by combustion disclosed in the Association of Official Analytical Chemists (AOAC) Method 992.23, or methods disclosed in the American Association of Cereal Chemists (AACC) Method 46-30, 1999. Moreover, those of skill in the art will understand that to convert measured nitrogen to protein a conversion factor may be used. A commonly used conversion factor in this respect is 6.25. The protein content of the compositions set forth in the present disclosure refer to an applied conversion factor of 6.25. Thus, for example, when reference is made herein to a sample containing 90% (w/w) protein, such a sample contains 90% (w/w) based on the application of a conversion factor of 6.25. The foregoing may be expressed herein as: "a sample containing 90% (w/w) protein (N×6.25)", or in a substantially similar manner.

In overview, it has surprisingly been realized that protein compositions, including protein concentrates containing high concentrations of protein moieties, some oil, and carbohydrates, and further including protein-lipid complex-containing mixtures may be recovered from comminuted whole plant parts of sunflower plants, wherein the protein moieties are substantially free of heat or solvent damage and thus, are present in non-denatured conformational states. The sunflower protein compositions produced by the methods disclosed herein may contain substantial quantities of essential amino acids. Furthermore, the sunflower protein compositions disclosed herein may retain desirable protein solubility characteristics, oil holding and water hydration properties, emulsion characteristics, foaming properties, and color profiles.

The sunflower protein compositions of the present disclosure are useful for the preparation of nutritional formulations including for example, nutritional aquaculture formulations, nutritional animal feed formulations, nutritional poultry formulations, and nutritional formulations suitable for human consumption, among others. Furthermore, the residual presence of plant oils in the present sunflower protein compositions may be beneficial as energy sources in nutritional formulations. The presence of plant oils in the present sunflower protein concentrates may obviate the need for addition of extraneous oil into nutritional feed formulations.

Accordingly, at least one embodiment of the present disclosure pertains to sunflower protein compositions comprising from about 34% (w/w) to about 80% (w/w) sunflower protein, from about 1% (w/w) to about 50% (w/w) sunflower oil, and up to about 25% (w/w) carbohydrates.

Furthermore, at least one embodiment of the present disclosure pertains to sunflower protein concentrates comprising at least about 65% (w/w) sunflower protein, from about 1% (w/w) to about 12% (w/w) plant oil, and from about 5% (w/w) to about 15% carbohydrates.

Furthermore, at least one embodiment of the present disclosure pertains to sunflower protein extracts comprising from about 50% (w/w) to about 65% (w/w) sunflower protein, from about 10% (w/w) to about 50% (w/w) plant oil, and from about 15% (w/w) to about 22% carbohydrates.

Furthermore, at least one embodiment of the present disclosure pertains to sunflower protein-lipid complex-containing mixtures comprising from about 30% (w/w) to about 50% (w/w) sunflower protein, from about 40% (w/w) to about 50% (w/w) plant oil, and from about 3% (w/w) and to about 15% (w/w) carbohydrates.

The sunflower protein compositions disclosed herein may be prepared from parts of sunflower plants, notably seeds, i.e. plants belonging to the plant species *Helianthus annuus*, wherein the seeds are produced and harvested by agricultural practices or by horticultural practices. Also suitable are sunflower subspecies, varieties, cultivars, genotypes, or hybrids.

Accordingly, another embodiment according to the present disclosure pertains to methods and processes for producing the disclosed sunflower plant protein compositions wherein the methods and processes generally comprise selecting a sunflower plant part, notably sunflower plant seeds, and the steps of deconstructing whole sunflower seeds with a selected process. The process involves dehulling the seeds and comminuting the dehulled seeds to produce a comminuted seed particle mixture, separating the comminuted seed mixture into a protein-containing liquid phase and a solid phase, and further separating the liquid phase into heavy high-protein fraction and a light liquid oleosome-containing fraction, then further processing the heavy high-protein fraction to produce therefrom a plurality of protein precipitates and retentates to produce therefrom one or more of the plant protein concentrates and/or protein-lipid containing mixtures. The methods disclosed herein avoid the use of organic solvents and high temperatures i.e. temperatures greater than 60° C.

Various suitable techniques and methods for processing seed materials from sunflower plant material to produce therefrom the present plant protein compositions are disclosed in the following sections. FIG. 1, FIGS. 2A-2C, FIGS. 3A-3B, and FIGS. 4A-4B illustrate schematic diagrams of example processes 100, 200, 300 and 400, wherein sunflower seeds are selected and used as the starting plant materials for preparing sunflower protein compositions in accordance with some embodiments of the present disclosure. Notably, process 100 and 200 illustrate schematic diagrams for preparing protein concentrates. Process 300 illustrates a schematic diagram for preparing a protein-lipid complex-containing mixture, and process 400 illustrates a schematic diagram for preparing protein extracts.

Thus, referring now to FIG. 1, example process 100 starts with providing a quantity of sunflower seeds, notably dehulled sunflower seeds 111. Sunflower seeds may be obtained, for example by agriculturally producing and harvesting seed, and/or by purchasing of sunflower seed from a commercial seed supplier, and then are subsequently dehulled. Dehulling results in removal of the typically white-colored, or black-colored, or black- and white-colored seed hull which may also be referred to as the shell, and allows the recovery of dehulled sunflower seeds 111, also referred to in the art as kernels. Dehulling equipment for sunflower seed is known to those skilled in this art. Prior to dehulling, the sunflower seeds may optionally be screened and cleaned if necessary or so desired, to remove extraneous materials such as debris or non-intact seed material. Furthermore, prior to dehulling, the sunflower seeds may also optionally be washed or surface-sterilized using for example, a chemical agent such as bleach, to reduce contaminating biological agents such as bacteria or fungi that may be present on the seed hulls. Furthermore, sunflower seeds, preferably dehulled sunflower seeds 111, may be soaked in water or in an aqueous solution.

Continuing in reference to FIG. 1, example process 100 further comprises comminuting step 120 wherein dehulled sunflower seeds 111 are comminuted whereby is produced a comminuted mixture of seed particles 121, preferably having particle sizes in a range of between about 5 μm and about 200 μm. Comminuting step 120 generally reduces the seed volume as well as the particle size of the comminuted seed. Step 120 may be carried out by conveying dehulled sunflower seeds 111 into comminuting equipment such as a seed mill, a colloid mill, a hammer mill, a blade mill, a roller mill, and the like. In other embodiments, a homogenizer such as a high-pressure homogenizer, may be used to comminute dehulled sunflower seed 111. In yet other embodiments, a sequential combination of a mill and a homogenizer or other such equipment may be used to comminute the seed 111.

It should be further noted that the selection of specific comminuting equipment and the operating conditions of the equipment may depend on the size of the selected sunflower seed 111. However, regardless of the comminuting equipment that is selected, upon completion of step 120, the comminuted seed particle mixture 121 will have mean particle sizes in a range of from about 5 μm to about 200 μm or from about 5 μm to about 100 μm, or mean particle sizes in a range of about 10 μm, about 25 μm, about 50 μm, about 100 μm, about 125 μm, about 150 μm, about 175 μm, about 200 μm, and therebetween. Preferably, the comminution equipment and conditions are selected so that the comminuted sunflower seed particles are homogenously sized, i.e. the particles can have tightly-centered mean-particle size, e.g. at least 90% of the particles can have a size not exceeding ±20% of the particle size, or not exceeding ±10% of the particle size, or not exceeding ±5% of the mean particle size. Furthermore, it should be noted that high temperatures i.e. temperatures in excess of 60° C. are avoided in the performance of comminuting step 121. Thus, comminuting step 121 may be conducted at ambient temperatures although it is understood that during operation of mechanical comminution equipment, the temperature of the seed mixture may increase above the ambient temperatures.

Comminuting step 121 may be carried out with the dehulled sunflower seed 111 suspended in an aqueous solution. Examples of suitable aqueous solutions include water and dilute solutions comprising, for example, a sodium salt solution such as NaCl or $Na_2SO_4$, for example. The aqueous solution may be added to the sunflower seed 111 prior to conveyance into the comminuting equipment or alternatively, while the sunflower seed 111 is being discharged from a seed bin or other seed-storage containers into the comminuting equipment. As hereinbefore noted, the use of organic solvents during performance of the comminuting step 121 is avoided.

Continuing in reference to FIG. 1, example process 100 may further comprise a separation step 130 during which the comminuted seed particle mixture is separated into a solid phase 131 and a liquid phase 132. Thus, separation step 130 yields two seed fractions. The separation step 130 may be carried out by conveying the comminuted seed particle mixture 121 into equipment suitable for separating the comminuted seed particle mixture 121 based on density differentials. Suitable separation equipment includes for example, a centrifuge such as a two-phase decanter operated at modest gravitational forces to separate a light liquid phase 132 and a heavy solid phase 131 containing seed particle solids. The liquid phase 132 recovered after separation therefrom of the heavy solid phase 131, contains the majority of the seed oil, and the separated solid phase 131 contains solid seed particulate material including for example, seed hull particles.

The recovered solid phase 131 may have a moisture content of from 67% to 83%, and a dry-basis composition of from about 33% (w/w) to about 46% (w/w) plant oil, from about 24% (w/w) to about 27% (w/w) protein, from about 4.5% (w/w) to about 5.5% (w/w) ash, and from about 22% (w/w) to about 40% (w/w) carbohydrate. Thus, for example, recovered solid phase 131 may have a moisture content of 66.7%, and a dry-basis composition of 45.9% (w/w) plant oil, 27.1% (w/w) protein, 5.4% (w/w) ash, and 21.5% (w/w) carbohydrate or, for example, recovered solid phase 131 may have a moisture content of 82.8%, and a dry based composition of 32.9% (w/w) plant oil, 23.9% (w/w) protein, 4.5% (w/w) ash, and 38.8% (w/w) carbohydrate.

Continuing in reference to FIG. 1, example process 100 may further comprise step 140 during which liquid phase 132 is separated into a light liquid phase 141 and a heavy protein containing liquid phase 142. Step 140 may be achieved by conveying the liquid phase 132 into separation equipment capable of further separating the liquid phase 132 based on density differential, for example, a low-shear centrifuge. The recovered heavy protein containing liquid phase 142 may contain a dry-basis composition of 5% (w/w) to 30% (w/w) oil, 48% to 55% (w/w) protein, 5% to 33% (w/w) ash and 14% to 32.0% (w/w) carbohydrate. Thus, for example, recovered heavy protein containing liquid phase 142 may have a dry-basis composition of 13.3% (w/w) plant oil, 49.7% (w/w) protein, 5.3% (w/w) ash, and 32.0% (w/w) carbohydrate or, for example, recovered heavy protein containing liquid phase 142 may have a dry-based composition of 4.7% (w/w) plant oil, 48.3% (w/w) protein, 33.3% (w/w) ash, and 13.7% (w/w) carbohydrate.

It should be noted that steps 130 and 140 may be performed concurrently by using a single-density differential-based separation equipment such as a 3-phase decanter that is capable of separating the comminuted seed particle mixture into a solid phase, a heavy liquid phase, and a light liquid phase.

Continuing in reference to FIG. 1, example process 100 may further comprise step 150 comprising subjecting the heavy protein-containing liquid phase 142 to microfiltration treatment to obtain permeate 151. This may be achieved by using a membrane filter, for example, a membrane filter having a pore size of about 1 to 3 μm.

Continuing in reference to FIG. 1, example process 100 may further comprise step 160 subjecting permeate 151 to ultrafiltration treatment to obtain retentate 161. This may be achieved by a filter, for example, having a molecular weight cut-off range from about 1.0 kDa to about 20 kDa.

Continuing in reference to FIG. 1, example process 100 may further comprise step 170 comprising drying retentate 161 to obtain first protein concentrate 171. In general, the moisture content of the retentate 161 may be modulated by controlling the drying process, for example, by extending or decreasing the drying time and/or by increasing or decreasing the drying temperature. In this manner, a substantially dry first protein concentrate 171 may be obtained. First protein concentrate 171 may have from about 63% (w/w) to about 67% (w/w) sunflower protein, from about 10% (w/w)

to about 14% (w/w) plant oil, and from about 14% (w/w) to about 16% (w/w) carbohydrates. For example, the first protein concentrate 171 may have a protein content of 64.6% on an as-is basis (68.8% on a dry matter basis), 11.7% oil (on an as-is basis), 15.2% carbohydrate (on an as-is basis), and 2.4% ash (on an as-is basis). Furthermore, the dried first protein concentrate 171 may have a moisture content from the range of about 5% (w/w) to about 7% (w/w). In some embodiments, first protein concentrate 171 may have total protein and plant oil content of about 76% (w/w). In some embodiments, first protein concentrate 171 may comprise a ratio of protein to oil of about 5.5:1 on a weight-by-weight basis. Furthermore, first protein concentrate 171 may have an essential amino acid content of about 20% (on an as-is percentage basis), and of about 31% (as a percentage of crude protein). Furthermore, the percentage solubility of first protein concentrate 171 may be about 82% at pH 2, about 76% at pH 3, about 74% at pH 4, about 71% at pH 5, about 62% at pH 6, and about 64% at pH 7. Furthermore, the oil-holding capacity (OHC) of first protein concentrate 171 may be about 2.4 g oil/g of protein, and the water-hydration capacity (WHC) may be from about 1.4 g water/g of protein. Furthermore, the emulsion stability of first protein concentrate 171 may be about 49%. Furthermore, the foaming capacity of first protein concentrate 171 may be about 5% at pH 3, about 0% at pH 5, and about 0% at pH 7. Furthermore, the foaming stability of first protein concentrate 171 may be about 0% at pH 3.

Figure 2A:
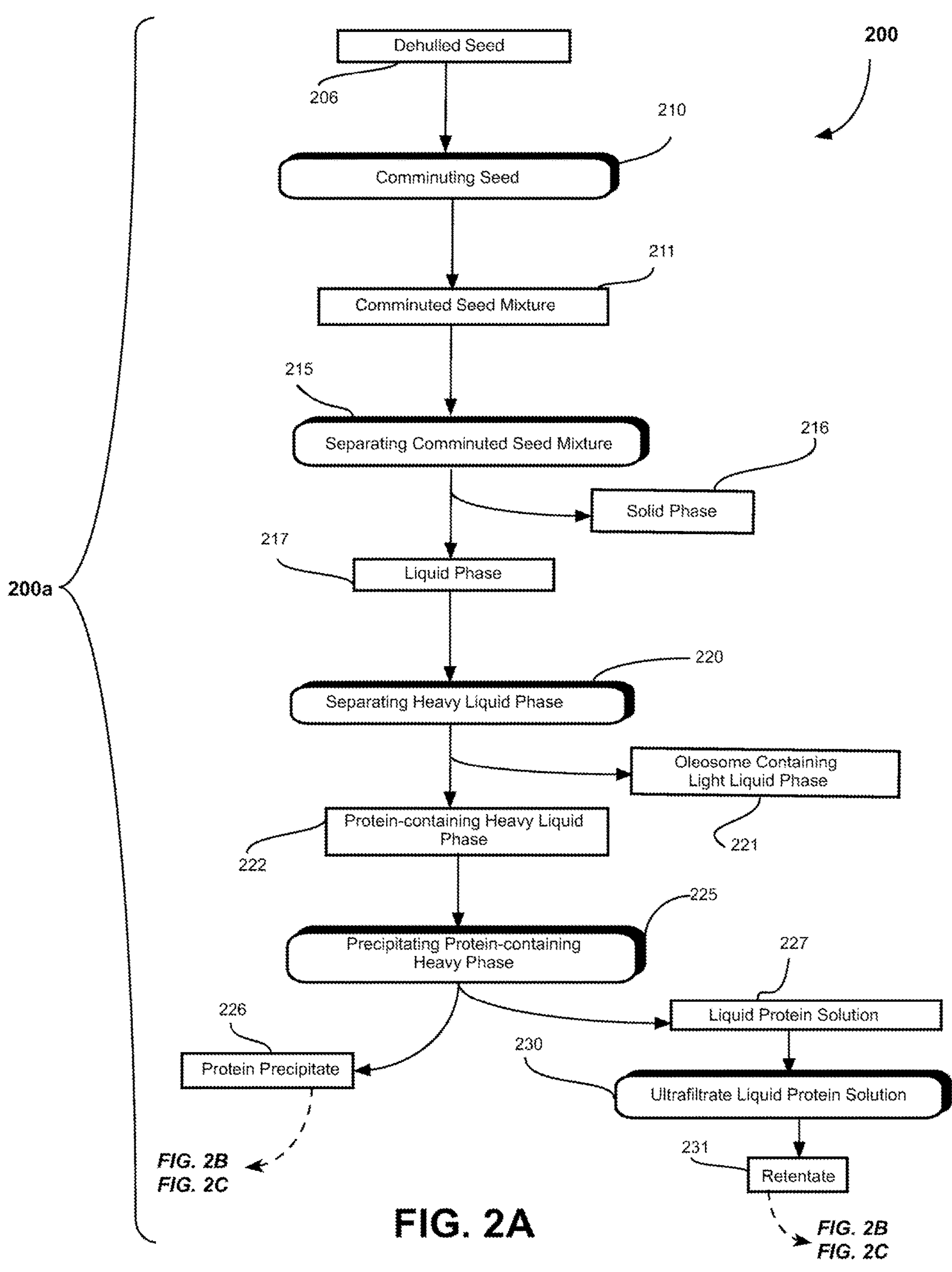
FIG. 2A is a schematic block diagram illustrating an example of a first process portion 200*a* of an example process 200 for making plant protein concentrates.
Figure 2B:
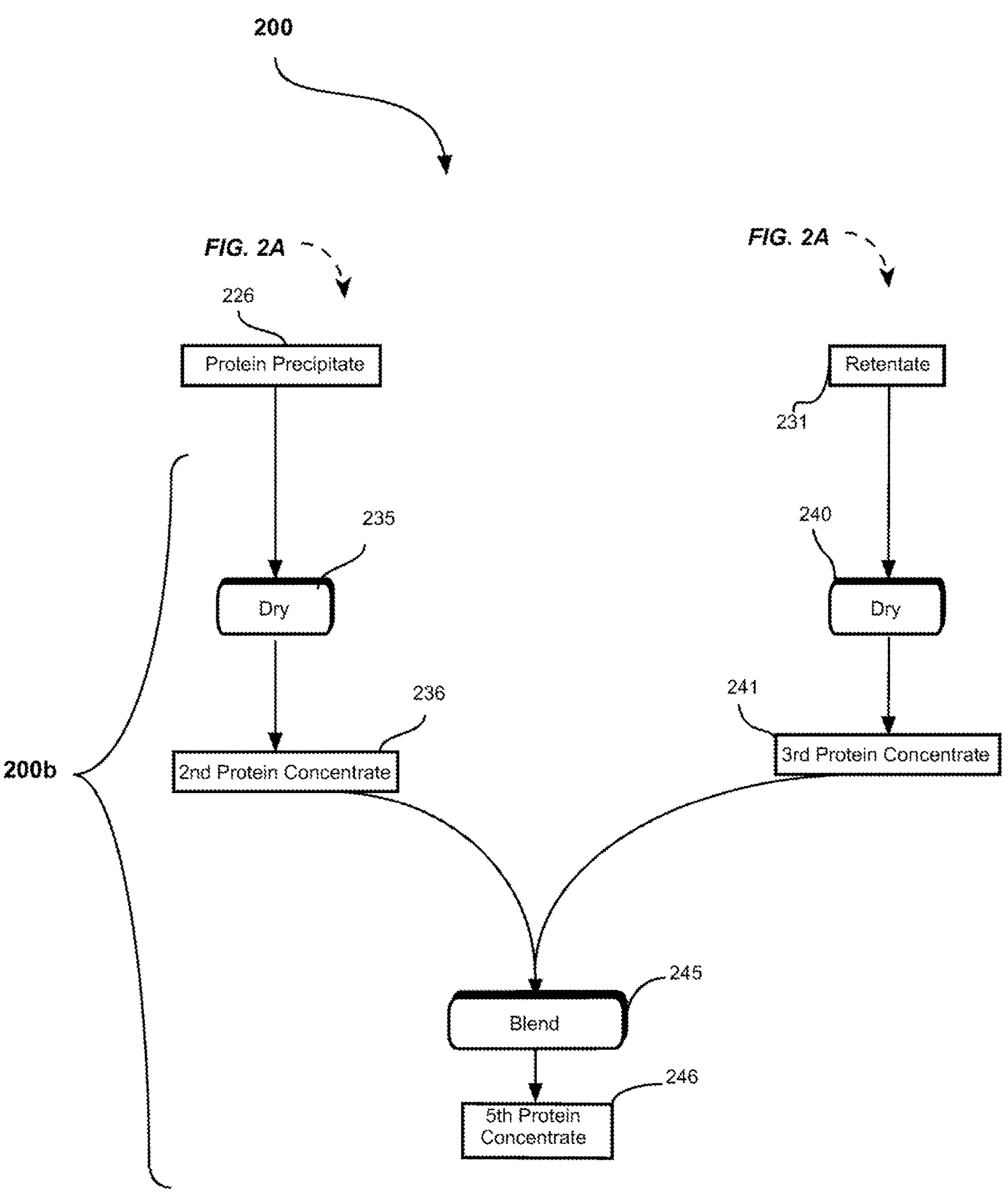
FIG. 2B is a schematic block diagram illustrating an example of a second process portion 200*b* of the example process 200 for making plant protein concentrates.
Figure 2C:
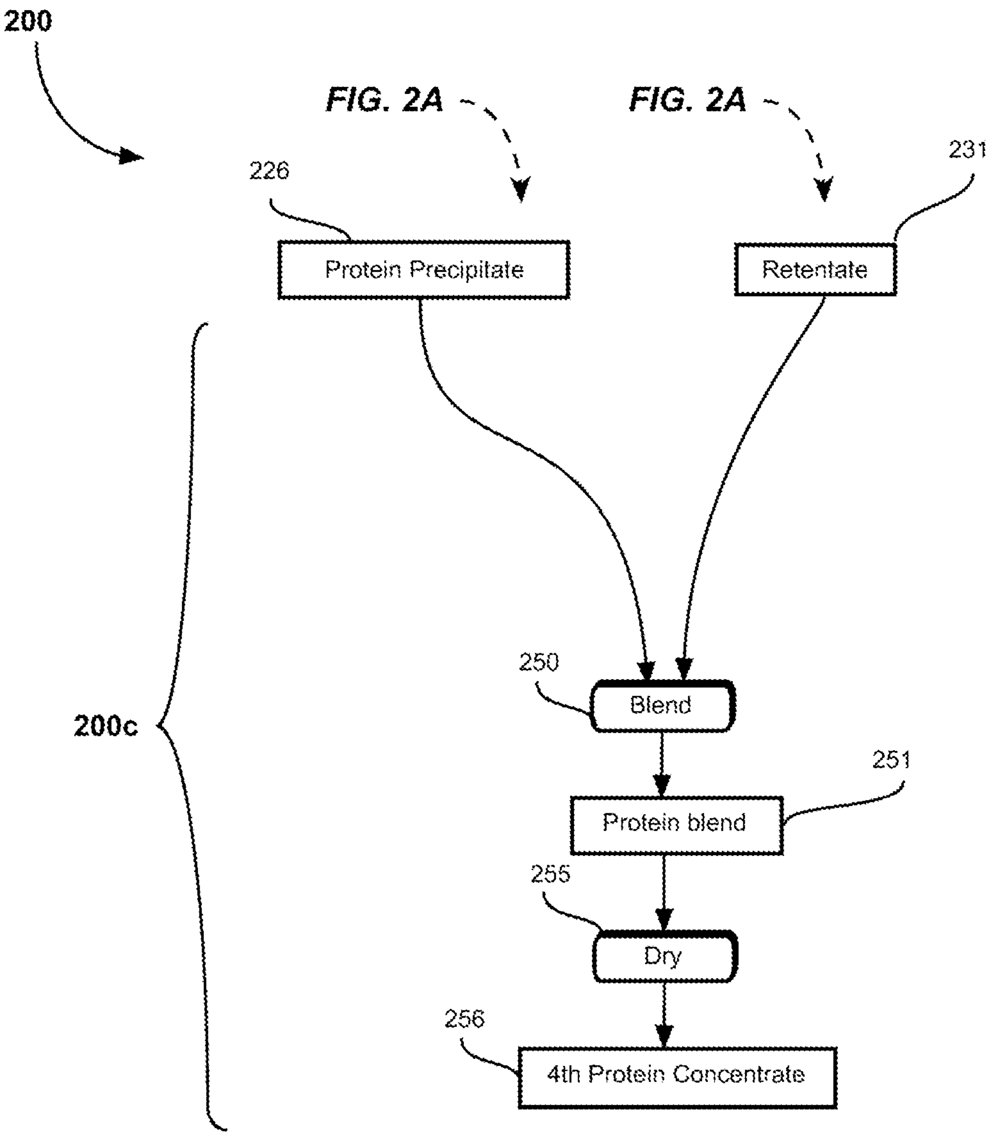
FIG. 2C is a schematic block diagram illustrating an example of a third process portion 200*c* of the example process 200 for making plant protein concentrates.

Turning next to another example process according to the present disclosure for preparing sunflower protein concentrates, example process 200 illustrated in FIGS. 2A-2C, comprises first process portion 200*a* (FIG. 2A) and may further comprise one of example second process portion 200*b* (FIG. 2B), or third process portion 200*c* (FIG. 2C) for use to recover plant protein concentrates from such processed plant materials. It is noted that in some embodiments, process portion 200*a* may be conducted, and then a first portion of the materials obtained, (i.e. protein precipitate 226 and retentate 231) may be used to conduct second process portion 200*b*, and a second portion of the materials obtained (i.e. protein precipitate 226 and retentate 231) may be used to conduct third process portion 200*c*.

Referring now to FIG. 2A, it is noted that in first process portion 200*a* of example process 200, initial steps and materials correspond with initial steps and materials of process 100 (see: FIG. 1), notably, steps 210, 215 and 220 correspond with steps 120, 130 and 140 respectively, of process 100, and materials 206, 211, 216, 217, 221 and 222 correspond with materials 111, 121, 131, 132, 141 and 142 respectively, of process 100. Thus, these steps are in what follows not further discussed in reference to process 200, and the reader may refer back to the description of process 100 herein or to Example 1, if desired. Instead, for the purposes of the following discussion of process 200, it will be assumed that protein-containing heavy liquid phase 222 (142 in process 100) is available.

Thus, continuing in reference to FIG. 2A, starting with protein-containing heavy liquid phase 222, example process 200 may further comprise step 225 comprising separating the protein-containing heavy liquid phase 222 to recover therefrom a protein precipitate 226, and a liquid protein solution 227. Step 225 may be performed by acidifying the protein-containing heavy liquid phase 225 to, for example, a pH of from about 3.5 to about 5.5. The acid-precipitated protein may be separated from liquid protein solution 227, for example, by feeding the acid-treated material into a clarifier centrifuge and recovering therefrom a solid protein preparation in the form of a protein precipitate 226, and a liquid protein solution 227. Protein precipitate 226 may have a protein content of about 79% (on a dry matter basis), about 10% oil (on a dry matter basis), about 8% carbohydrate (on a dry matter basis), and about 3% ash (on a dry matter basis). Protein precipitate 226 may be dried to yield second protein concentrate 236. Second protein concentrate 236 may have from about 76% (w/w) to about 80% (w/w) sunflower protein, from about 8% (w/w) to about 12% (w/w) plant oil, and from about 3% (w/w) to about 5% (w/w) carbohydrates. For example, second protein concentrate 236 may have a protein content of 77.6% on an as-is basis (83% on a dry matter basis), 9.5% oil (on an as-is basis), 3.7% carbohydrate (on an as-is basis), and 2.7% ash (on an as-is basis). Furthermore, the dried first protein concentrate 236 may have a moisture content from the range of about 5% (w/w) to about 7% (w/w). In some embodiments, second protein concentrate 236 may have total protein and plant oil content of about 87% (w/w). In some embodiments, second protein concentrate 236 may comprise a ratio of protein to oil of about 8:1 on a weight-by-weight basis. Furthermore, second protein concentrate 236 may have an essential amino acid content of about 27% (on an as-is percentage basis), and about 35% (as a percentage of crude protein). Furthermore, the percentage solubility of second protein concentrate 236 may be about 56% at pH 2, about 62% at pH 3, about 34% at pH 4, about 22% at pH 5, about 11% at pH 6, and about 28% at pH 7. Furthermore, the oil-holding capacity (OHC) of second protein concentrate 236 may be about 1.9 g oil/g of protein, and the water-hydration capacity (WHC) may be from about 1.7 g water/g of protein. Furthermore, the emulsion stability of second protein concentrate 236 may be about 88%. Furthermore, the foaming capacity of second protein concentrate 236 may be about 11% at pH 3, about 10% at pH 5, and about 12.5% at pH 7. Furthermore, the foaming stability of second protein concentrate 236 may be about 100% at pH 3, about 50% at pH 5, and about 80% at pH 7. Furthermore, second protein concentrate 236 may have the following colorimetric characteristics: a lightness value L* of from about 40%, a red/green tone value a* of from about −4.5, and a yellow/blue tone value b* of from about 9.5.

Continuing in reference to FIG. 2, example process 200 may further comprise step 230 comprising processing liquid protein solution 227 by an ultrafiltration treatment and recovering therefrom retentate 231. The ultrafiltration equipment used may vary and may have a membrane unit having a molecular weight cut-off 20 kDa or less, 10 kDa or less, or 1 kDa or less.

Retentate 231 may have a composition of about 1% (w/w) oil, about 75% (w/w) protein, about 11% (w/w) ash, and about 13% (w/w) carbohydrate.

Referring now to FIG. 2B and second process portion 200*b* shown therein, in accordance with step 235 protein precipitate 226 may be dried to obtain second protein concentrate 236. Furthermore, retentate 231 may also be dried to obtain third protein concentrate 241. Third protein concentrate 241 may be a composition having from about 66% (w/w) to about 70% (w/w) sunflower protein, from about 0.5% (w/w) to about 2% (w/w) plant oil, and from about 11% (w/w) to about 15% (w/w) carbohydrates. For example, third protein concentrate 241 may have a protein content of 67.9% on an as-is basis (72.3% on a dry matter basis), 1.0% oil (on an as-is basis), 12.7% carbohydrate (on an as-is basis), 12.4% ash (on a dry matter basis), and a moisture content of 6.0%. In some embodiments, third protein concentrate 241 may have total protein and plant oil content of about 69% (w/w). In some embodiments, third protein concentrate 241 may comprise a ratio of protein to oil of about 66:1 on a weight-by-weight basis. Furthermore, third protein concentrate 241 may have an essential amino acid content of about 19% (on an as-is percentage basis), and about 27% (as a percentage of crude protein). Furthermore, third protein concentrate 241 may have an essential amino acid content of about 27% (on an as-is percentage basis), and about 35% (as a percentage of crude protein). Furthermore, the percentage solubility of third protein concentrate 241 may be about 99% at pH 2, about 78% at pH 3, about 72% at pH 4, about 59% at pH 5, about 86% at pH 6, and about 100% at pH 7. Furthermore, the oil-holding capacity (OHC) of third protein concentrate 241 may be about 1.2 g oil/g of protein, and the water-hydration capacity (WHC) may be from about 1.1 g water/g of protein. Furthermore, the emulsion stability of third protein concentrate 241 may be about 38%. Furthermore, the foaming capacity of third protein concentrate 241 may be about 63% at pH 3, about 110% at pH 5, and about 120% at pH 7. Furthermore, the foaming stability of third protein concentrate 241 may be about 94% at pH 3, about 90% at pH 5, and about 94% at pH 7. Furthermore, third protein extract 241 may have the following colorimetric characteristics: a lightness value L* of from about 56%, a red/green tone value a* of from about −3, and a yellow/blue tone value b* of about 11.5.

Subsequently, second and third protein concentrates 236 and 241 may be blended (step 245) to obtain fifth protein concentrate 246. Fifth protein concentrate 246 may be a composition having from about 73% (w/w) to about 77% (w/w) sunflower protein, from about 8% (w/w) to about 12% (w/w) plant oil, and from about 3% (w/w) to about 7% (w/w) carbohydrates. For example, fifth protein concentrate 246 may have a protein content of 74.7% on an as-is basis (78.9% on a dry matter basis), 9.9% plant oil (on an as-is basis), 4.8% carbohydrate (on an as-is basis), 5.3% ash (on an as-is basis), and a moisture content of 5.3%. In some embodiments, fifth protein concentrate 246 may have total protein and plant oil content of about 87% (w/w). In some embodiments, fifth protein concentrate 246 may comprise a ratio of protein to oil of about 7.5:1 on a weight-by-weight basis. Furthermore, fifth protein concentrate 246 may have an essential amino acid content of about 25% (on an as-is percentage basis), and about 33% (as a percentage of crude protein). Furthermore, the percentage solubility of fifth protein concentrate 246 may be about 100% at pH 2, about 71% at pH 3, about 78% at pH 4, about 61% at pH 5, about 79% at pH 6, and about 65% at pH 7. Furthermore, the oil-holding capacity (OHC) of fifth protein concentrate 246 may be about 2.0 g oil/g of protein, and the water-hydration capacity (WHC) may be from about 0.3 g water/g of protein. Furthermore, the emulsion stability of fifth protein concentrate 246 may be about 83%. Furthermore, the foaming capacity of first protein concentrate 246 may be about 100% at pH 3, about 120% at pH 5, and about 120% at pH 7. Furthermore, the foaming stability of fifth protein concentrate 246 may be about 80% at pH 3, about 94% at pH 5, and about 76% at pH 7.

Referring now to FIG. 2C and third process portion 200*c* shown therein, in accordance with step 250 protein precipitate 226 and retentate 231 may be blended to obtain protein blend 251. Subsequently protein blend 251 may be dried (step 255) to obtain fourth protein concentrate 256. Fourth protein concentrate 256 may be a composition having from about 73% (w/w) to about 77% (w/w) sunflower protein, from about 8% (w/w) to about 12% (w/w) plant oil, and from about 3% (w/w) to about 7% (w/w) carbohydrates. For example, fourth protein concentrate 256 may have a protein content of 74.7% on an as-is basis (78.9% on a dry matter basis), 9.9% oil (on an as-is basis), 4.8% carbohydrate (on an as-is basis), 5.3% ash (on an as-is basis), and a moisture content of 5.3%. In some embodiments, fourth protein concentrate 256 may have total protein and plant oil content of about 85% (w/w). In some embodiments, fourth protein concentrate 256 may comprise a ratio of protein to oil of about 7.5:1 on a weight-by-weight basis. Furthermore, fourth protein concentrate 256 may have an essential amino acid content of about 25% (on an as-is percentage basis), and about 33% (as a percentage of crude protein).

Turning next to another example process according to the present disclosure, in particular a process for preparing protein extracts. Example process 400 illustrated in FIGS. 4A-4B, comprises first process portion 400*a* (FIG. 4A) and second process portion 400*b* (FIG. 4B) for use to recover plant protein extracts from such processed plant materials.

Figure 4A:
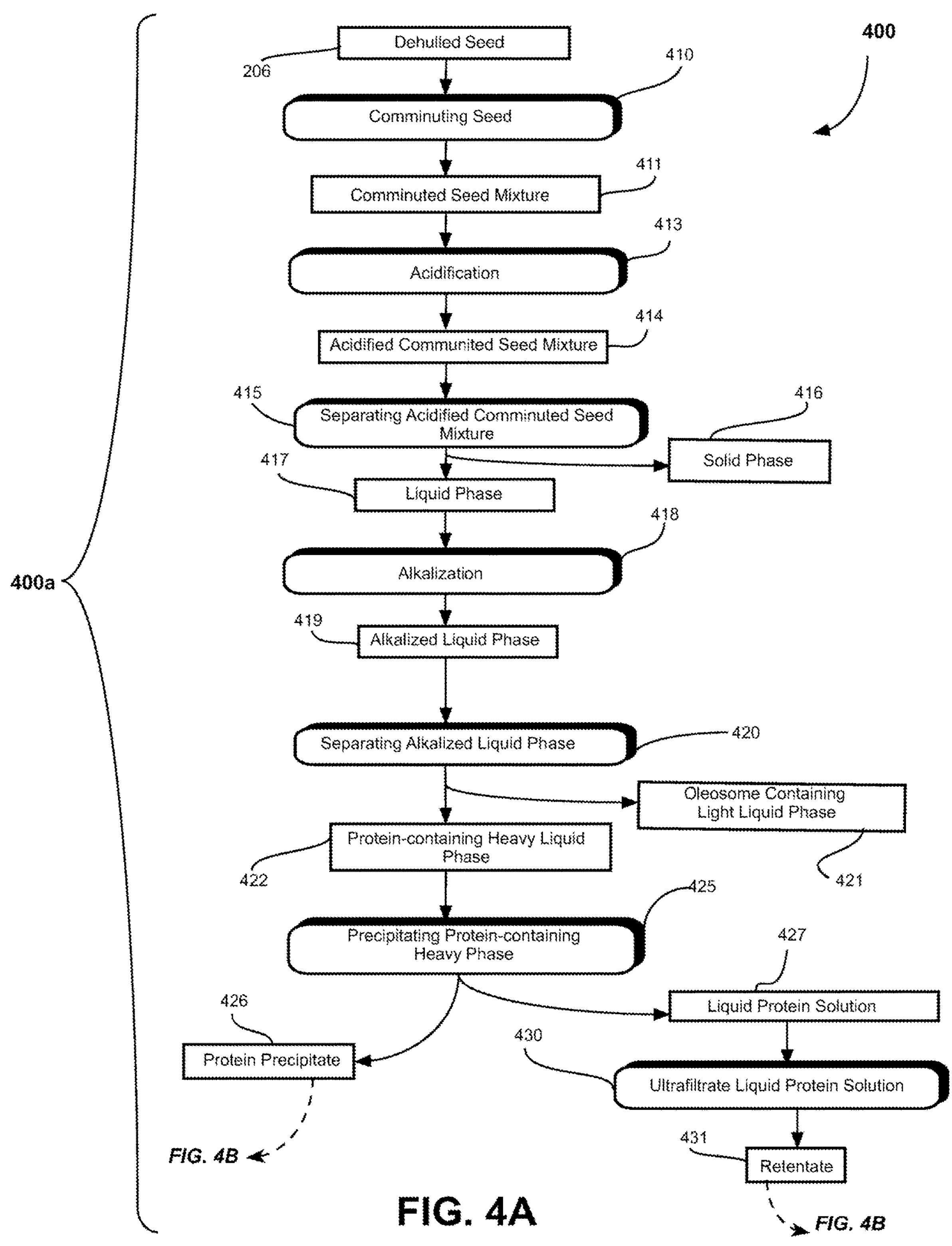
FIG. 4A is a schematic block diagram illustrating an example of a first process portion 400*a* of an example process 400 for making plant protein extracts.

Referring now to FIG. 4A, it is noted initially that there are certain similarities between example process 400 and example process 200, notably there are certain similarities between first process portion 200*a* of process 200 and first process portion 400*a* of process 400, and between second process portion 200*b* of process 200 and second process portion 400*b* of process 400. In particular, first process portion 200*a*, steps 210, 215, 220, 225 and 230 can be seen to correspond with steps 410, 415, 420, 425 and 430, respectively, in first process portion 400*a*. Furthermore, in second process portion 200*b*, steps 235 and 240 can be seen to correspond with steps 435 and 440, respectively, in second process portion 400*b*. It is noted, however that first process portion 400*a* contains additional (relative to first process portion 200*a*), steps 413 and 418, as hereinafter further described. There are also similarities between the materials of example processes 200 and 400. Thus, in first process portion 200*a*, materials 206, 211, 216, 217, 221, 222, 226, 227 and 231 can be seen to correspond with materials 406, 411, 416, 417, 421, 422, 426, 427 and 431 respectively, in first process portion 400*a*. It is noted that these materials are similar in that they result from the performance of substantially the same corresponding steps e.g. liquid phase 217 and liquid phase 417 each are obtained from a step (step 215 and step 415, respectively) involving separating a comminuted seed mixture; protein precipitate 226 and 426 each are obtained from a step (step 225 and step 425, respectively) involving precipitating a protein-containing heavy phase, and so on. Furthermore, these materials are similar in that they, resulting from the performance of substantially the same corresponding steps, may be described in the same broad terms, e.g. "retentate", "heavy liquid phase", "liquid protein solution", and so forth. However, it is noted that the performance of steps 413 and 418 in example process 400 yields materials 416, 417, 421, 422, 426, 427, 431, 436 and 441 that are constituted in a manner that substantively differs from the materials 216, 217, 221, 222, 226, 227, 231, 236 and 241 respectively. Notably the oil and protein constituents of materials 416, 417, 421, 422, 426, 427, 431, 436 and 441 can vary from the oil and protein constituents of materials 216, 217, 221, 222, 226, 227, 231, 236 and 241. Thus, for example, recovered heavy protein containing liquid phase 222 (corresponding with 142 in FIG. 1) obtained in the performance of process 200 may have a dry based composition of 4.7% (w/w) plant oil and 48.3% (w/w) protein. Corresponding heavy protein containing liquid phase 422 obtained in the performance of process 400 may have a dry-based composition of 49.6% (w/w) plant oil, and 19.5% (w/w) protein. In what follows, steps 413 and 418 will be further described. For other parts of example process 400, the reader may refer back to the description of process 200 (and where appropriate process 100) herein, or to Example 3, if desired.

Thus, continuing in reference to FIG. 4A, starting with comminuted seed mixture 411, example process 400 may comprise step 413 comprising acidifying comminuted seed mixture 411. The term "acidifying" means that the pH of the comminuted seed is reduced to a pH in the acidic pH range, notably a pH of about 6.5 or lower, including such as a pH of about pH 6, about 5.5, about 5, about 4.5, or about 4, by adding to comminuted seed mixture 411 for example, a sufficient amount of phosphoric acid, sulfuric acid, or hydrochloric acid, and mixing comminuted seed mixture 411 therewith to obtain acidified comminuted seed mixture 414. Next, acidified comminuted seed mixture 414 is separated (step 415).

Continuing in reference to FIG. 4A, starting with liquid phase 417, example process 400 may comprise step 418 comprising alkalizing liquid phase 417. The term "alkalizing" means that the pH of the comminuted seed is increased to a pH of about pH 7.0 to about pH 8.0, preferably about a pH of 7.8, by adding to liquid phase 417, for example, a sufficient amount of sodium hydroxide, and mixing liquid phase 417 therewith to obtain alkalized liquid phase 419. Next, alkalized liquid phase 419 is separated (step 420).

Figure 4B:
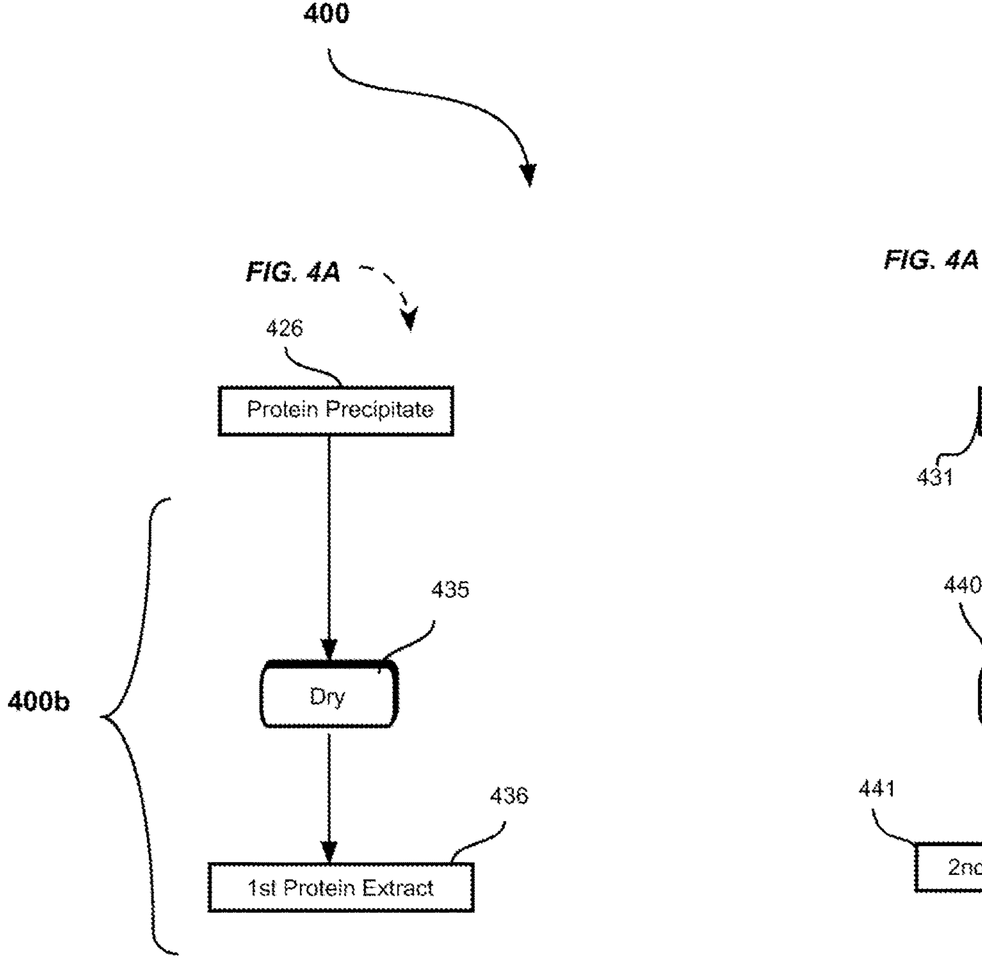
FIG. 4B is a schematic block diagram illustrating an example of a second process portion 400*b* of the example process 200 for making plant protein extracts.

Referring next to FIG. 4B, protein precipitate 426 may dried to obtain first protein extract 436. First protein extract 436 may have a protein content of about 55% (on a dry matter basis), about 37% oil (on a dry matter basis), and about 9.5% ash (on a dry matter basis). Furthermore, first protein extract 436 may have an essential amino acid content of about 36% (as a percentage of crude protein). Furthermore, first protein extract 436 may have the following colorimetric characteristics: a lightness value L* of about 67%, a red/green tone value a* of about −3, and a yellow/blue tone value b* of about 7.

Continuing in reference to FIG. 4B, retentate 431 may dried to obtain second protein extract 441. Second protein extract 441 may have a protein content of about 55% (on a dry matter basis), about 13% oil (on a dry matter basis), about 22% carbohydrates, and about 10% ash (on a dry matter basis). Furthermore, second protein extract 441 may have an essential amino acid content of about 30% (as a percentage of crude protein). Furthermore, second protein extract 441 may have the following colorimetric characteristics: a lightness value L* of about 67%, a red/green tone value a* of about −0.8, and a yellow/blue tone value b* of about 11. To briefly recap, the example processes 100, 200 and 400 may each provide selectable protein precipitates and selectable protein retentates, each of which may be selectively dried to form prepared protein compositions comprising concentrates and protein extracts. The prepared sunflower protein concentrates may at least contain about 65% (w/w) sunflower protein, from about 1% (w/w) to about 12% (w/w) plant oil, and from about 5% (w/w) and to about 15% (w/w) carbohydrates. The prepared sunflower protein extracts may contain from about 50% (w/w) to about 65% (w/w) sunflower protein, from about 10% (w/w) and to about 50% (w/w) plant oil, and up to about 22% (w/w) carbohydrates.

Turning next to another example process according to the present disclosure, it is noted that the present disclosure further provides processes for producing protein-lipid complex-containing mixtures. Thus, referring now to example process 300 and FIGS. 3A-3B, it is noted that in first process portion 300*a* of example process 300, initial steps and materials correspond with initial steps and materials of process 100 (see: FIG. 1), notably steps 320, 330 and 340 correspond with steps 120, 130 and 140 respectively, of process 100, and materials 311, 321, 331, 332, 341 and 342 correspond with materials 111, 121, 131, 132, 141 and 142 respectively, of process 100. Thus, these steps are in what follows not further discussed in reference to process 300, and the reader may refer back to the description of process 100 herein, or to Example 1, if desired. Instead, for the purposes of the following discussion of process 300, it will be assumed that protein containing heavy liquid phase 342 (142 in process 100) and oleosome-containing light liquid phase 341 (141 in process 100) are available.

Figure 3A:
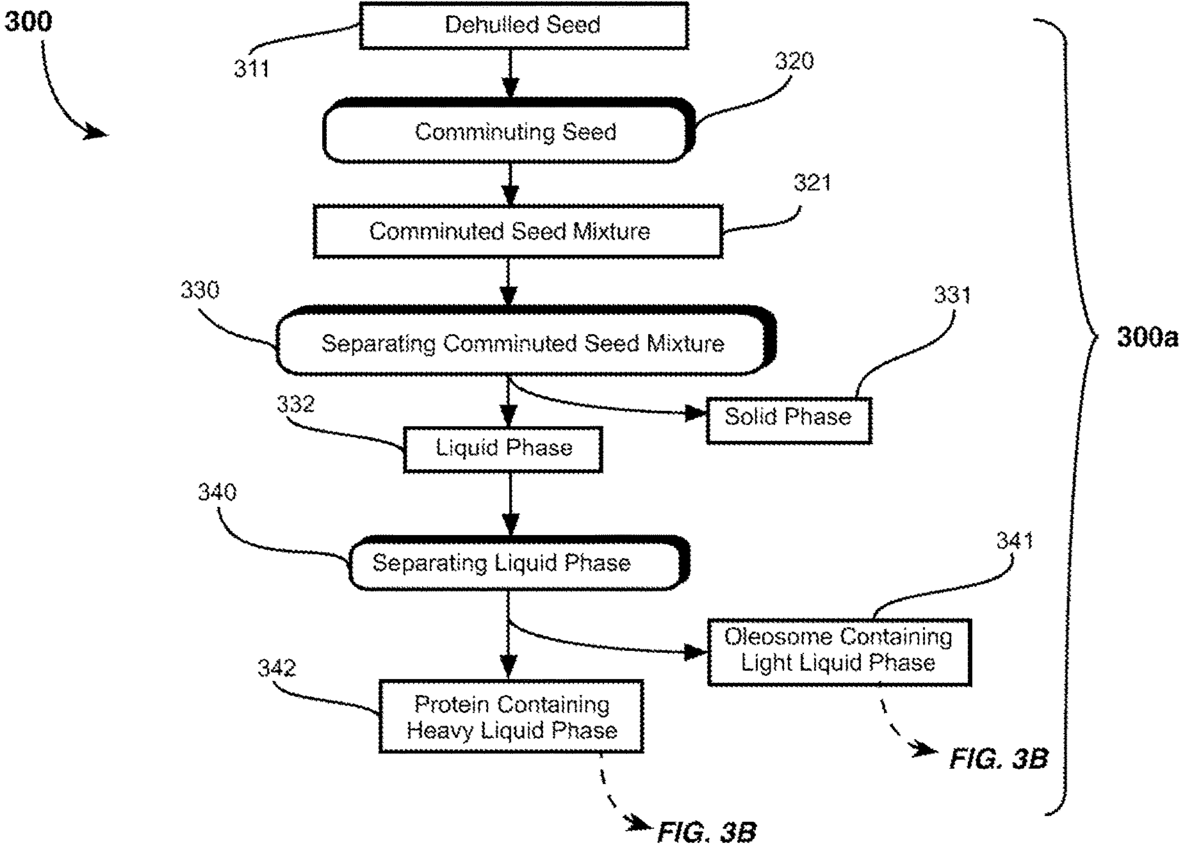
FIG. 3A is a schematic block diagram illustrating an example of a first process portion 300*a* of an example process 300 for making plant protein-lipid mixtures.
Figure 3B:
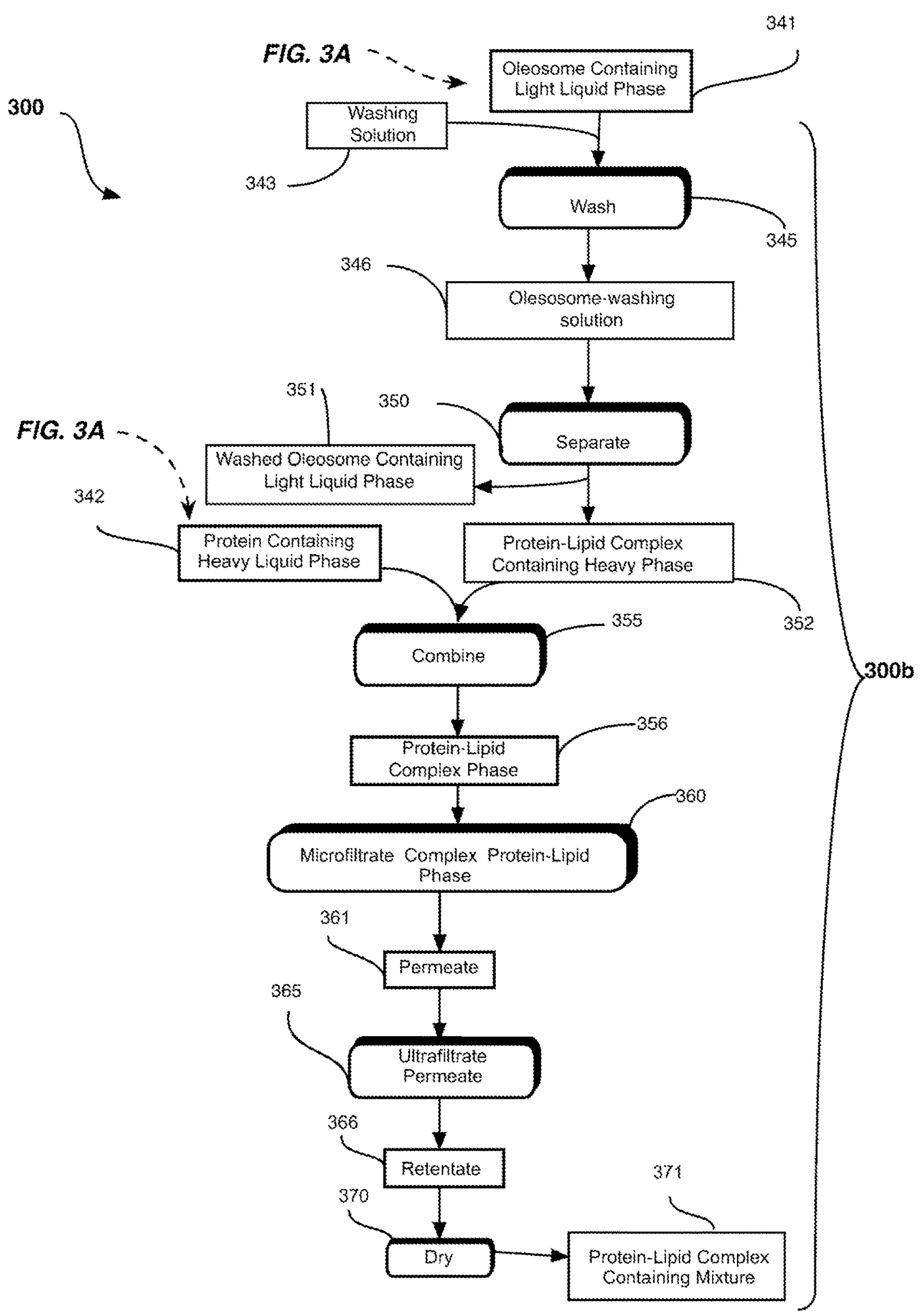
FIG. 3B is a schematic block diagram illustrating an example of a second process portion 300*b* of the example process 300 for making plant protein-lipid mixtures.

Thus, referring to FIG. 3B, starting with oleosome-containing light liquid phase 341, example process 300 (and example process portion 300*b* thereof) may further comprise step 345 comprising washing oleosome-containing liquid phase 341 using washing solution 343 to recover therefrom washed oleosome-containing washed oleosomes 351 and heavy protein lipid phase 352. In this respect, oleosome-containing light liquid phase 341 may be washed (step 345) using a washing solution 343, for example a sodium salt solution and the pH may be adjusted to an acidic pH. Oleosome-containing light liquid phase 341 may then be separated, using for example a centrifuge and yielding washed oleosome-containing light liquid phase 351 and protein-lipid containing heavy liquid phase 352.

Continuing in reference to FIG. 3B, example process 300 (and example process portion 300*b*) may further comprise step 355 combining protein-containing heavy liquid phase 342 (see: example process portion 300*a*) and protein-lipid complex-containing heavy liquid phase 352 to form protein-lipid complex phase 356. This generally may be achieved by conveying protein-containing heavy liquid phase 342 and protein-lipid complex-containing heavy liquid phase 352 in to a mixing vessel, for example a mixing tank, and mixing protein-containing heavy liquid phase 342 (see: example process portion 300*a*) and protein-lipid complex-containing heavy liquid phase 352 until a homogenous mixture is formed.

Continuing in reference to FIG. 3B, example process 300 (and example process portion 300*b* thereof) may further comprise step 360 comprising subjecting protein-lipid complex phase 356 to microfiltration using, for example, a 1-3 μm filter. Resultant permeate 361 may be subjected to ultrafiltration (step 365) using, for example, a 1 kDa to 5 kDa molecular weight cut-off membrane to provide retentate 366. Retentate 366 then may be dried to provide protein-lipid complex-containing mixture 371 from process 300.

Protein-lipid complex-containing mixture 371 may be a composition having from about 32% (w/w) to about 36% (w/w) sunflower protein, from about 48% (w/w) to about 52% (w/w) plant oil, and from about 7% (w/w) to about 11% (w/w) carbohydrates. For example, protein-lipid complex-containing mixture 371 may have a protein content of 34.4% on an as-is basis (37.6% on a dry matter basis), 49.9% plant oil (on an as-is basis), 8.6% carbohydrate (on an as-is basis), 3.1% ash (on an as-is basis), and a moisture content of 3.1%. In some embodiments, protein-lipid complex-containing mixture 371 may have total protein and plant oil content of about 84.2% (w/w). In some embodiments, protein-lipid complex-containing mixture 371 may comprise a ratio of protein to oil of about 0.7:1 on a weight-by-weight basis.

The sunflower protein compositions of the present disclosure may be prepared without exposing the starting selected sunflower plant materials to high temperatures or to solvents. Thus, the proteins from sunflower plants recovered by the fractionation processes described herein will not have sustained any heat damage or solvent damage. As a result, sunflower protein concentrates and protein-lipid complex-containing mixtures disclosed herein may be light colored, relatively odorless, and bland in taste. Furthermore, the sunflower proteins within the various sunflower protein concentrates and protein-lipid complex-containing mixtures described herein may be substantially non-denatured and may retain their primary and/or their secondary and/or their tertiary three-dimensional structures.

According to one aspect, the sunflower protein concentrates may comprise at least about 70% (w/w) sunflower protein on an as-is basis.

According to another aspect, the sunflower protein concentrates may comprise at least about 75% (w/w) sunflower protein on an as-is basis.

According to another aspect, the sunflower protein concentrates may comprise at least about 80% (w/w) sunflower protein on an as-is basis.

According to another aspect, the sunflower protein concentrates may comprise from at least about 65% (w/w) to about 80% (w/w) sunflower protein.

According to another aspect, the sunflower protein concentrates may comprise a total protein and plant oil content of at least about 69% (w/w).

According to another aspect, the sunflower protein concentrates may comprise a total protein and plant oil content of from about 68% to about 70% (w/w), and wherein the total plant oil content is 1% (w/w) or less.

According to another aspect, the sunflower protein concentrates may comprise a ratio of protein to oil of at least 5.5:1 on a weight-by-weight basis.

According to another aspect, the sunflower protein concentrates may comprise a ratio of protein to oil of at least 5.5:1 to about 66:1 on a weight-by-weight basis.

According to another aspect, the sunflower protein-lipid complex-containing mixture may comprise from about 32% (w/w) to about 36% (w/w) protein, from about 48% (w/w) to about 52% (w/w) plant oil, and from about 6.5% (w/w) to about 10.5% (w/w) carbohydrates.

According to another aspect, the sunflower protein-lipid complex-containing mixture may comprise a total protein and plant oil content of about 84% (w/w).

According to another aspect, the sunflower protein-lipid complex-containing mixture may comprise a ratio of protein to oil of about 0.7:1 on a weight-by-weight basis.

Another embodiment of the present disclosure relates to sunflower protein compositions comprising weight percentages of essential amino acids of at least about 29% by weight crude protein.

Another embodiment of the present disclosure relates to sunflower protein compositions comprising weight percentages of essential amino acids of at least about 35% by weight crude protein.

According to an aspect, the weight percentages of lysine in the sunflower protein compositions may be at least about 2.8% by weight crude protein.

According to another aspect, the weight percentages of lysine in the sunflower protein compositions may be at least about 4.4% by weight crude protein.

Another embodiment relates to sunflower protein compositions disclosed herein having moisture contents from a range of about 2% (w/w) to about 6.5% (w/w).

Another embodiment relates to sunflower protein compositions disclosed herein having ash contents from about 2.4% (w/w) to about 12% (w/w).

According to some embodiments of the present disclosure, sunflower protein compositions produced by the processes described herein may be used as ingredients in nutritional formulations. In order to prepare the nutritional formulations, one or more of the protein compositions from selected sunflower species disclosed herein may be contacted with or blended with or mixed together with at least one other formulary ingredient suitable for use to prepare a nutritional product composition. Furthermore, at least one other formulary ingredient may be provided in any suitable form such as for example, a solution, a suspension, a gel, a liquid, a solid, a powder, a crystal, and the like. The quantity of the at least one other formulary ingredient may vary and may depend on the type of nutritional formulation that is being prepared. Furthermore, a plurality of additional formulary ingredients may be provided, for example 2, 3, 4, 5, 6, 7, 8, 9, 10 or more formulary ingredients to prepare the nutritional formulation.

In some embodiments, a formulation suitable for inclusion in a nutritional product comprising a mixture of formulary ingredients may be pre-formed, and the protein composition may be separately provided and incorporated into the pre-formed formulary ingredient mixture.

In some embodiments, the sunflower protein composition may be incorporated during preparation of the nutritional formulation. In such embodiments, the sunflower protein composition may be added separately or alternatively, the sunflower protein concentrate may be incorporated together with one or more other formulary compounds.

The final concentration of the sunflower protein composition in the nutritional product may vary. In some embodiments, the sunflower protein composition may comprise at least about 10% (w/w) of the nutritional formulation. In other embodiments, the sunflower protein composition may comprise at least about 20% (w/w), at least about 30% (w/w), at least about 40% (w/w), at least about 50% (w/w), at least about 60% (w/w), at least about 70% (w/w), at least about 80% (w/w), or at least about 90% (w/w) of the nutritional formulation. The concentration of the sunflower protein composition may be optimized or adjusted by preparing a plurality of sample nutritional formulations wherein each formulation comprises a different concentration of the sunflower protein composition, then evaluating each of the formulations with reference to one or more nutritional effects, then selecting one or more of the formulations to provide a selected desirable effect.

In some embodiments, the additional formulary ingredient incorporated in the nutritional formulations of the present disclosure may be a natural ingredient. Since the protein concentrates disclosed herein are natural compositions, in some embodiments, the nutritional formulations may be formulated using additional natural formulary ingredients thereby providing one or more natural nutritional formulations.

In some embodiments, the additional formulary ingredient may be a synthetic ingredient for example stabilizing agents such as xanthan and gellan, for example coagulating agents such as calcium sulfate and magnesium chloride, and agglomerating agents such as hydrolyzed lecithin and the like.

In accordance with the foregoing, the present disclosure provides another embodiment relating to methods for preparing nutritional formulations comprising the plant protein compositions disclosed herein, wherein the methods comprise:

(i) providing a plant protein composition from a selected sunflower species comprising from about 30% (w/w) to about 80% (w/w) sunflower protein, from about 1% (w/w) to about 12% (w/w) plant oil, and up to about 25% (w/w) carbohydrates, the balance of the protein composition substantially being constituted by water and ash;

(ii) providing one or more formulary ingredients suitable for inclusion into a nutritional formulation; and (iii) formulating the plant protein composition with the formulary ingredient by blending or mixing to produce a nutritional formulation comprising the plant protein composition.

Another embodiment of the present disclosure relates to use of a sunflower protein composition disclosed herein as an ingredient for preparing a nutritional formulation, wherein the sunflower protein composition comprises from about 30% (w/w) to about 80% (w/w) protein, from about 1% (w/w) to about 12% (w/w) plant oil, up to about 25% (w/w) carbohydrates, the balance of the sunflower protein composition substantially being constituted by water and ash.

Another embodiment of the present disclosure relates to a nutritional formulation comprising a sunflower protein composition comprising at least from about 34% (w/w) to about 80% (w/w) plant protein, from about 1% (w/w) to about 12% (w/w) plant oil, up to about 22% (w/w) carbohydrates, the balance of the sunflower protein composition substantially being constituted by water and ash.

Some nutritional formulations incorporating the sunflower protein compositions disclosed herein may be suitable for use as an animal feed. Some nutritional formulations incorporating the sunflower protein compositions disclosed herein may be suitable for use as a fish feed or an aquaculture feed. Some nutritional formulations incorporating the sunflower protein compositions disclosed herein may be suitable for human consumption. Some nutritional formulations incorporating the sunflower protein compositions disclosed herein may be suitable for use as a poultry feed or a pig feed or a companion animal feed or a feed formulation for juvenile animals.

Hereinafter are provided examples of further specific embodiments for performing the methods of the present disclosure, as well as embodiments representing the compositions of the present disclosure.

EXAMPLES

Example 1—Preparation of a First Sunflower Protein Concentrate from a First Example Process The current Example refers to process 100 depicted in FIG. 1. Dehulled (<1% hulls) *Helianthus annuus* seeds 111 (500 kg, 55.8% oil content, 18.5% protein) were fed by an auger to a mill along with a buffer solution in reverse osmosis (RO) water minutes to produce a wet-milled aqueous slurry of seed. The milled slurry underwent immediate particle size reduction through a colloid mill. The final homogenized slurry (i.e. comminuted seed mixture 121) was fed into a centrifuge decanter with enough force on the slurry to enable separation of solid phase 131 and liquid phase 132. Solid phase 131 was a first co-product of process 100 and had a moisture content of 66.7% and a dry-basis composition comprising 45.9% (w/w) oil, 27.1% (w/w) protein, 5.4% (w/w) ash, and 21.5% (w/w) carbohydrate. The corresponding decanter liquid phase 132, comprising a mixture of liquefied seed components, was separated in a two-phase disc-stack separator. The resulting oleosome-containing light liquid phase 141 directed most of the seed oil (>65%) away from the production pathway for protein. To that end, the corresponding protein containing heavy liquid phase 142 (1,266 kg) had the following dry-basis composition: 13.0% (w/w) oil, 49.7% (w/w) protein, 5.3% (w/w) ash and 32.0% (w/w) carbohydrate. A portion of the protein containing heavy liquid phase 142 underwent microfiltration. The resultant permeate underwent ultrafiltration to produce retentate 161, a sample of which was dried to yield a first protein concentrate 171 from example process 100. The first protein concentrate 171 had the composition shown in Table 1 and an amino acid composition shown in Table 2. First protein concentrate 171 had a total protein plus total oil value of 76.3 and a protein:oil factor of 5.5:1.

TABLE 1

| First protein concentrate: 171 | |
|---|---|
| Composition: | |
| Crude Protein (% dry matter) | 68.8 |
| Crude Protein (%) | 64.6 |
| Moisture (%) | 6.1 |
| Crude Fat (%) | 11.7 |
| Crude Ash (%) | 2.4 |
| Carbohydrate (by difference, %) | 15.2 |

TABLE 2

| First protein concentrate: 171 | | |
|---|---|---|
| Amino Acids: | % As-is basis | % of Crude Protein |
| Alanine | 3.16 | 4.89 |
| Arginine | 5.82 | 9.01 |
| Aspartic acid | 5.84 | 9.04 |
| Glutamic acid | 13.67 | 21.16 |
| Glycine | 3.67 | 5.68 |
| Histidine | 1.53 | 2.37 |
| Isoleucine | 2.44 | 3.78 |
| Leucine | 3.77 | 5.84 |
| Phenylalanine | 2.80 | 4.33 |
| Proline | 3.66 | 5.67 |
| Serine | 3.00 | 4.64 |
| Threonine | 2.03 | 3.14 |
| Lysine | 2.40 | 3.72 |
| Tyrosine | 1.62 | 2.51 |
| Valine | 2.93 | 4.54 |
| Cysteine | 0.86 | 1.33 |
| Methionine | 1.35 | 2.09 |
| Tryptophan | 0.83 | 1.28 |
| Essential Amino Acids | 20.08 | 31.09 |

Example 2—Preparation of a Second, Third, Fourth and Fifth Sunflower Protein Concentrate from a Second Example Process The current Example refers to process 200 depicted in FIGS. 2A-2C. Dehulled (<1% hulls) *Helianthus annuus* seeds 206 (100 kg, 53.7% oil content, 25.1% protein) were fed by a auger to a mill along with reverse osmosis (RO) water to produce a wet-milled aqueous slurry of seed with a seed:water ratio of 1:4. The slurry output from the mill underwent immediate and continuous particle size reduction by processing through homogenizers, and then was collected in a holding tank with continuous mixing. After the entire slurry output was processed, additional RO-water was flushed through the series of mills and added to the slurry holding tank to provide a final slurry with a seed:water ratio of 1:6.8. The final slurry was again processed through the mills and collected in a second holding tank with continuous mixing. After the homogenized slurry was collected in the second holding tank, an aqueous solution of sodium hydroxide to give slurry pH of 7.8 was added to the tank and mixed. The final homogenized slurry (i.e. comminuted seed mixture 211) was fed a centrifuge decanter with sufficient force on the slurry to separate a solid phase 216 from liquid phase 217. Solid phase 216 (96.7 kg) was the first co-product of process 200 and had a moisture content of 82.8% and a dry-basis composition of 32.9% (w/w) oil, 23.9% (w/w) protein, 4.5% (w/w) ash, and 38.8% (w/w) carbohydrate. The corresponding decanter liquid phase 217 comprising a mixture of liquefied seed components was processed to reduce the oil to protein ratio in the resulting heavy liquid phase 220 which, if produced from an untreated decanter liquid phase 217, had a dry basis composition of 20.7% (w/w) oil, 63.1% (w/w) protein, and directed >8% of the total seed oil in the liquid phase 222 into the protein production pathway. The liquid phase 217 was continuously mixed in its holding tank before the treated liquid phase was separated in a two-phase disc-stack separator. The resulting oleosome-containing light liquid phase 221 directed most of the seed oil (>85%) away from the production pathway for protein to thereby facilitate production of low-fat protein concentrates. The corresponding protein containing heavy liquid phase 222 had dry-basis composition of 4.7% (w/w) oil, 48.3% (w/w) protein, 33.3% (w/w) ash, 13.7% (w/w) carbohydrate, and less than 2.5% of the total seed oil in the liquid phase 217. The pH of the protein-containing heavy liquid phase 222 was adjusted to pH 5.0, and the resulting mixture was separated in a centrifuge. Resulting pellet 226 had a composition of 79.2% (on a dry matter basis), 10.1% oil (on a dry matter basis), 7.9% carbohydrate (on a dry matter basis), and 2.9% ash (on a dry matter basis). Referring further to FIG. 2B, a sample of the resulting pellet or protein precipitate 226 was dried to produce a second protein concentrate 236 from process 200 with the composition shown in Table 3 and an amino acid composition shown in Table 4. Second protein concentrate 236 had a total protein plus total oil value of 87.1 and a protein:oil factor of 8.2:1.

TABLE 3

| Second protein concentrate: 236 | |
|---|---|
| Composition: | |
| Crude Protein (% dry matter) | 83.0 |
| Crude Protein (%) | 77.63 |
| Moisture (%) | 6.5 |
| Crude Fat (%) | 9.49 |
| Crude Ash (%) | 2.72 |
| Carbohydrate (by difference, %) | 3.66 |

TABLE 4

| Second protein concentrate: 236 | | |
|---|---|---|
| Amino Acids: | % As-is basis | % of Crude Protein |
| Alanine | 3.51 | 4.52 |
| Arginine | 7.20 | 9.27 |
| Aspartic acid | 8.14 | 10.49 |
| Glutamic acid | 16.77 | 21.60 |
| Glycine | 3.64 | 4.69 |
| Histidine | 2.13 | 2.74 |
| Isoleucine | 3.68 | 4.74 |
| Leucine | 5.23 | 6.74 |
| Phenylalanine | 4.39 | 5.66 |
| Proline | 3.62 | 4.66 |
| Serine | 3.22 | 4.15 |
| Threonine | 2.69 | 3.47 |
| Lysine | 2.19 | 2.82 |
| Tyrosine | 2.24 | 2.89 |
| Valine | 4.05 | 5.22 |
| Cysteine | 0.77 | 0.99 |
| Methionine | 1.69 | 2.18 |
| Tryptophan | 1.31 | 1.69 |
| Essential Amino Acids | 27.36 | 35.26 |

Liquid protein solution 225 was processed by ultrafiltration to produce retentate 231. Retentate 231 had a composition of 0.8% (w/w) oil, 74.8% (w/w) protein, 11.3% (w/w) ash, and 13.1% (w/w) carbohydrate. Referring to FIG. 2B, a sample of retentate 231 was dried to produce a third protein concentrate 241 from process 200 with the composition shown in Table 5 and an amino acid composition shown in Table 6. Third protein concentrate 241 had a total protein plus total oil value of 69.0 and a protein:oil factor of 66.0:1.

TABLE 5

| Third protein concentrate: 241 | |
|---|---|
| Composition: | |
| Crude Protein (% dry matter) | 72.28 |
| Crude Protein (%) | 67.94 |
| Moisture (%) | 6.0 |
| Crude Fat (%) | 1.03 |
| Crude Ash (%) | 12.35 |
| Carbohydrate (%, by difference) | 12.68 |

TABLE 6

| Third protein concentrate: 241 | | |
|---|---|---|
| Amino Acids: | % As-is basis | % of Crude Protein |
| Alanine | 2.36 | 3.47 |
| Arginine | 6.2 | 9.13 |
| Aspartic acid | 5.34 | 7.86 |
| Glutamic acid | 16.64 | 24.49 |
| Glycine | 4.11 | 6.05 |
| Histidine | 1.41 | 2.08 |
| Isoleucine | 2.36 | 3.47 |
| Leucine | 3.36 | 4.95 |
| Phenylalanine | 1.83 | 2.69 |
| Proline | 3.05 | 4.49 |
| Serine | 2.59 | 3.81 |
| Threonine | 2.26 | 3.33 |
| Lysine | 2.96 | 4.36 |
| Tyrosine | 1.38 | 2.03 |
| Valine | 2.9 | 4.27 |
| Cysteine | 1.83 | 2.69 |
| Methionine | 1.94 | 2.86 |
| Tryptophan | 0.44 | 0.65 |
| Essential Amino Acids | 19.46 | 28.66 |

Based on the process ratio of the solid contents in the fractions 236 and 241, the dried pellet precipitate 226 and dried retentate 241 powders were combined in a ratio of 2.17 to 1 to produce a blend constituting fifth protein concentrate 246 from process 200 having the composition shown in Table 7 and an amino acid composition shown in Table 8. Fifth protein concentrate 246 had a total protein plus total oil value of 84.6 and a protein:oil factor of 7.5:1.

TABLE 7

| Fifth protein concentrate: 246 | |
|---|---|
| Composition: | |
| Crude Protein (% dry matter) | 78.87 |
| Crude Protein (%) | 74.69 |
| Moisture (%) | 5.30 |
| Crude Fat (%) | 9.91 |
| Crude Ash (%) | 5.34 |
| Carbohydrate (by difference, %) | 4.76 |

TABLE 8

| Fifth protein concentrate: 246 | | |
|---|---|---|
| Amino Acids: | % As-is basis | % of Crude Protein |
| Alanine | 3.15 | 4.21 |
| Arginine | 6.88 | 9.22 |
| Aspartic acid | 7.26 | 9.72 |
| Glutamic acid | 16.73 | 22.40 |
| Glycine | 3.79 | 5.07 |
| Histidine | 1.90 | 2.55 |
| Isoleucine | 3.26 | 4.37 |
| Leucine | 4.64 | 6.21 |
| Phenylalanine | 3.58 | 4.80 |
| Proline | 3.44 | 4.61 |
| Serine | 3.02 | 4.05 |
| Threonine | 2.55 | 3.42 |
| Lysine | 2.43 | 3.26 |
| Tyrosine | 1.97 | 2.64 |
| Valine | 3.69 | 4.94 |
| Cysteine | 1.10 | 1.48 |
| Methionine | 1.77 | 2.37 |
| Tryptophan | 1.04 | 1.39 |
| Essential Amino Acids | 24.86 | 33.31 |

Referring to FIG. 2A in conjunction with FIG. 2C, the pH of protein-containing heavy liquid phase 222 was adjusted and the resulting mixture was separated in a centrifuge. The pellet or protein precipitate 226 (22 kg) had the dry-basis composition of 10.1% (w/w) oil, 79.2% (w/w) protein, 2.9% (w/w) ash, and 7.9% (w/w) carbohydrate. Liquid protein solution 227 was processed by ultrafiltration to produce retentate 231 (29.2 kg), which had the following dry-basis composition: 0.8% (w/w) oil, 74.8% (w/w) protein, 11.3% (w/w) ash, and 13.1% (w/w) carbohydrate. The pellet 226 and retentate 231 were combined and dried to produce a blend constituting a fourth protein concentrate 256 from process 200 with the composition shown in Table 9 and an amino acid composition shown in Table 10. Fourth protein concentrate 256 had a total protein plus total oil value of 84.6 and a protein:oil factor of 7.5:1.

TABLE 9

| Fourth protein concentrate: 256 | |
|---|---|
| Composition: | |
| Crude Protein (% dry matter) | 78.87 |
| Crude Protein (%) | 74.69 |
| Moisture (%) | 5.3 |
| Crude Fat (%) | 9.91 |

TABLE 9-continued

| Fourth protein concentrate: 256 | |
|---|---|
| Composition: | |
| Crude Ash (%) | 5.34 |
| Carbohydrate (by difference, %) | 4.76 |

TABLE 10

| Fourth protein concentrate: 256 | | |
|---|---|---|
| Amino Acids: | % As-is basis | % of Crude Protein |
| Alanine | 3.15 | 4.21 |
| Arginine | 6.88 | 9.22 |
| Aspartic acid | 7.26 | 9.72 |
| Glutamic acid | 16.73 | 22.40 |
| Glycine | 3.79 | 5.07 |
| Histidine | 1.90 | 2.55 |
| Isoleucine | 3.26 | 4.37 |
| Leucine | 4.64 | 6.21 |
| Phenylalanine | 3.58 | 4.80 |
| Proline | 3.44 | 4.61 |
| Serine | 3.02 | 4.05 |
| Threonine | 2.55 | 3.42 |
| Lysine | 2.43 | 3.26 |
| Tyrosine | 1.97 | 2.64 |
| Valine | 3.69 | 4.94 |
| Cysteine | 1.10 | 1.48 |
| Methionine | 1.77 | 2.37 |
| Tryptophan | 1.04 | 1.39 |
| Essential Amino Acids | 24.86 | 33.31 |

Example 3—Preparation of a First and Second Sunflower Protein Extract from a Third Example Process This Example refers to process 400 depicted in FIGS. 4A-4C. Dehulled (<1% hulls) *Helianthus annuus* seeds 206 (45.6% oil content, 21.7% protein) were fed by an auger into a mill along with reverse osmosis (RO) water to produce a wet-milled aqueous slurry of seed having a seed:water ratio of 1:6.8. The slurry outputted by the mill underwent immediate and continuous particle size reduction by processing through homogenizers (step 410) thereby producing a comminuted seed mixture 411 that was collected in a holding tank with continuous mixing. The pH of the comminuted mixture was reduced to 5.0 (step 413). The acidified final homogenized slurry (i.e. comminuted seed mixture 414) was fed into a centrifuge decanter with sufficient force on the slurry to separate solid phase 416 from liquid phase 417 (step 415). Solid phase 416 was the first co-product of process 400. The corresponding decanter liquid phase 417 had a moisture content of 91.8% and a dry-basis composition of 64.8% (w/w) oil, 21.5% (w/w) protein, 13.7% (w/w). The pH of decanter liquid phase 417 was increased to pH to 7.8 using sodium hydroxide to obtain alkalized liquid phase 419 (step 418). Alkalized liquid phase 419 was then centrifugally separated (step 420) to provide protein-containing heavy liquid phase 422 having a dry-basis composition of 49.6% (w/w) oil, 19.5% (w/w) protein, and 40.9% (w/w) combined ash and carbohydrate. The pH of the protein-containing heavy liquid phase 422 was adjusted to 5.5, and the resulting mixture was separated in a centrifuge to provide resulting pellet 426 (step 425). Referring further to FIG. 4B, a sample of the resulting pellet or protein precipitate 426 was dried (step 435) to provide a first protein extract 436 from process 400 with the composition shown in Table 11 and an amino acid composition shown in Table 12. First protein extract 436 had a total protein plus total oil value of 90.5 and a protein:oil factor of 1.5:1.

TABLE 11

| First protein extract: 436 | |
|---|---|
| Composition: | |
| Crude Protein (% dry matter) | 54.9 |
| Crude Protein (%) | 53.7 |
| Moisture (%) | 2.2 |
| Crude Fat (%) | 36.8 |
| Crude Ash (%) | 9.4 |
| Carbohydrate (by difference, %) | ND |

TABLE 12

| First protein extract: 436 | | |
|---|---|---|
| Amino Acids: | % As-is basis | % of Crude Protein |
| Alanine | 2.43 | 4.53 |
| Arginine | 4.7 | 8.75 |
| Aspartic acid | 5.47 | 10.19 |
| Glutamic acid | 10.93 | 20.35 |
| Glycine | 2.62 | 4.88 |
| Histidine | 1.45 | 2.70 |
| Isoleucine | 2.5 | 4.66 |
| Leucine | 3.63 | 6.76 |
| Phenylalanine | 3.05 | 5.68 |
| Proline | 2.31 | 4.30 |
| Serine | 2.35 | 4.38 |
| Threonine | 1.94 | 3.61 |
| Lysine | 1.71 | 3.18 |
| Tyrosine | 1.65 | 3.07 |
| Valine | 2.82 | 5.25 |
| Cysteine | 0.5 | 0.93 |
| Methionine | 1.27 | 2.36 |
| Tryptophan | 0.85 | 1.58 |
| Essential Amino Acids | 19.22 | 35.79 |

Referring again to FIG. 4A, liquid protein solution 427 was processed by ultrafiltration (step 430) to produce retentate 431. Referring again to FIG. 4B, a sample of retentate 431 was dried (step 440) to produce a second protein extract 441 from process 400 with the composition shown in Table 13 and an amino acid composition shown in Table 14. Second protein extract 441 had a total protein plus total oil value of 66.2 and a protein:oil factor of 4.1:1.

TABLE 13

| Second protein extract: 441 | |
|---|---|
| Composition: | |
| Crude Protein (% dry matter) | 54.4 |
| Crude Protein (%) | 53.2 |
| Moisture (%) | 2.2 |
| Crude Fat (%) | 13.0 |
| Crude Ash (%) | 9.8 |
| Carbohydrate (%, by difference) | 21.8 |

TABLE 14

| Second protein extract: 441 | | |
|---|---|---|
| Amino Acids: | % As-is basis | % of Crude Protein |
| Alanine | 2.10 | 3.95 |
| Arginine | 4.27 | 8.03 |
| Aspartic acid | 4.12 | 7.74 |
| Glutamic acid | 11.43 | 21.48 |
| Glycine | 4.12 | 7.74 |
| Histidine | 1.24 | 2.33 |
| Isoleucine | 1.81 | 3.40 |
| Leucine | 2.61 | 4.91 |
| Phenylalanine | 1.17 | 2.20 |
| Proline | 2.26 | 4.25 |
| Serine | 2.24 | 4.21 |
| Threonine | 2.15 | 4.04 |
| Lysine | 2.72 | 5.11 |
| Tyrosine | 1.12 | 2.11 |
| Valine | 2.18 | 4.10 |
| Cysteine | 1.42 | 2.67 |
| Methionine | 1.78 | 3.35 |
| Tryptophan | 0.34 | 0.64 |
| Essential Amino Acids | 16.00 | 30.08 |

Example 4—Preparation of a Sunflower Lipid-Protein Complex-Containing Mixture from a Third Example Process The current Example refers to process 300 depicted in FIGS. 3A-3B. *Helianthus annuus* seeds 311 (45.2% oil content, 20.3% protein) were processed with a hammer mill. The milled slurry underwent immediate particle size reduction by processing through a second mill. The homogenized slurry (i.e. comminuted seed mixture 321) was immediately fed at into a centrifuge decanter with sufficient force to separate solid phase 331 from liquid phase 332. The liquid phase 332, comprising a mixture of liquefied seed components was processed through a separator to produce oleosome-containing light liquid phase 341. The oleosome-containing light liquid phase 341 contained 30% of the seed oil whereas the corresponding heavy liquid phase 342 had the dry-basis oil and protein contents of 29.6% (w/w) and 54.8%% (w/w) respectively. The light liquid phase 341 was washed with a 50 mM solution of sodium bicarbonate and the pH was adjusted to 4.0 with 85% (w/w) phosphoric acid. A portion of the washed light liquid phase 341 was separated in a two-phase disc-stack separator to produce washed oleosome-containing light liquid phase 351 and a heavy liquid phase 342 having dry-basis oil content of 57.1% (w/w) and protein content of 27.1% (w/w). The heavy liquid phases 342 and liquid phase 352 were combined to and processed by microfiltration to produce permeate 361 which was flushed with RO-water was again processed by ultrafiltration to produce retentate 366, a sample of which was dried to produce a first protein-lipid complex-containing mixture 371 from process 300 with the composition shown in Table 15.

TABLE 15

| Protein-Lipid Complex-containing Mixture 371 | |
|---|---|
| Composition: | |
| Crude Protein (% dry matter) | 37.6 |
| Crude Protein (%) | 34.4 |
| Moisture (%) | 4.1 |
| Crude Fat (%) | 49.8 |

TABLE 15-continued

| Protein-Lipid Complex-containing Mixture 371 | |
|---|---|
| Composition: | |
| Crude Ash (%) | 3.1 |
| Carbohydrate (%, by difference) | 8.6 |

The protein lipid complex-containing mixture 371 had a total protein plus total oil value of 84.2 and a protein:oil factor of 0.7.

Example 5—Protein Solubility

This Example illustrates the protein solubility of the sunflower protein products prepared according to the present disclosure as described in Examples 1 and 2. Protein solubility was tested by a modified version of the procedure of Morr et al., 1985, J. Food Sci., 50: 1715-1718. 2.0 g of protein powder were dispersed in 200 mL of reverse osmosis (RO) water and then the mixture stirred until a smooth paste formed. The solution pH of aliquots were adjusted to pH 2, 3, 4, 5, 6, or 7 using 10N HCl, 85% $H_3PO_4$, or 50% NaOH. The aliquots were then stirred at 500 rpm using an overhead mixer for 60 minutes at 4° C. to facilitate solubilization of the proteins. Samples were left static for 10 min to allow aggregates to precipitate, and then transferred to 50 mL falcon tubes and centrifuged for 15 min at room temperature (25° C.) at 3000×g. After centrifugation, the protein contents of the supernatants were measured by combustion using a Flashsmart protein analyzer (% Nitrogen×6.25). The percent protein solubility values were determined based on division of the protein content value in the supernatant by the protein content value in the initial sample (×100), with any samples measured as over 100% recorded as 100%. Protein Solubility (%)=(% protein in supernatant/% protein in initial dispersion)×100.

The protein solubility of the products at different pH values is shown in Table 16.

TABLE 16

Protein solubility

| Product | Solubility (%) | | | | | |
|---|---|---|---|---|---|---|
| | pH 2 | pH 3 | pH 4 | pH 5 | pH 6 | pH 7 |
| 171 | 80.3 | 75.9 | 74.3 | 71.2 | 62.2 | 63.7 |
| 236 | 55.9 | 62.0 | 34.0 | 21.9 | 10.9 | 27.9 |
| 241 | 98.5 | 78.2 | 72.4 | 59.4 | 85.5 | 100 |
| 246 | 100 | 70.8 | 77.7 | 61.1 | 79.1 | 65.2 |

Example 6—Oil-Holding Capacity and Water-Hydration Capacity

This Example illustrates the oil-holding capacity (OHC) and water-hydration capacity (WHC) of the sunflower protein products prepared according to the present disclosure as described in Examples 1 and 2. OHC and WHC were tested by a modified version of the procedure of Stone et al., 2015, Food Sci. Biotechnol., 27: 827-833. 0.25 g of protein product was transferred into a pre-weighed 50 mL centrifuge tube. Then, 10 mL of hemp oil or reverse osmosis water were added, followed by vortexing (S/P® Vortex Mixer; VWR Inc.) for 10 s every 5 min for a total of 30 min. The samples were centrifuged at 1000 rpm for 15 min using an Eppendorf centrifuge 5810. The supernatants were decanted after which, the tubes and pellets were weighed. For WHC, the tubes were placed upside down for 10 min prior to weighing. OHC and WHC values were calculated in g (oil or water)/g of protein product using the following equation:

OHC or WHC=(Wet sample weight−Dry sample weight)/Dry sample weight.

The OHC and WHC values are shown in Table 17.

TABLE 17

Oil-holding capacity and Water-hydration capacity

| Product | OHC | WHC |
|---|---|---|
| 171 | 2.44 | 1.36 |
| 236 | 1.90 | 1.66 |
| 241 | 1.18 | 1.07 |
| 246 | 2.03 | 0.29 |

Example 7—Emulsion Stability

This Example illustrates the emulsion stability (ES) of the sunflower protein products prepared according to the present disclosure as described in Examples 1 and 2. ES was tested by a modified version of the procedure of Galves et al., 2019, Cereal Chem., 96: 1036-1047. ES of dispersions of the protein products (0.25% w/w) were determined by homogenizing 40 mL of a protein solution with 20 mL of hemp oil using a L5M-A Laboratory Mixer Silverson brand homogenizer positioned near the oil-water interface at 10,260 rpm for 10 min. The emulsions formed were immediately transferred to 50-mL graduated cylinders and observed for separation of the aqueous phase from the turbid phase of the emulsions after 30 min. The emulsion stability was calculated by equation below:

$$ES = \frac{V_B - V_A}{V_B} \times 100\%$$

where $V_B$ is the volume of the aqueous phase before homogenization (40 mL) and $V_A$ is the volume of the aqueous phase 30 minutes after homogenization.

The emulsion stability for various products is shown in Table 18.

TABLE 18

Emulsion stability

| Product | ES (%) |
|---|---|
| 171 | 48.8 |
| 236 | 87.5 |
| 241 | 37.5 |
| 246 | 82.7 |

Example 8—Foaming Properties

This Example illustrates the foaming capacity (FC) and stability (FS) of the sunflower protein products prepared according to the present disclosure as described in Examples 1 and 2. FC and FS were tested by a modified version of the procedure of Galves et al., 2019. Foam was produced by vortexing (SIP® Vortex Mixer; VWR Inc.) 1% (w/w) dispersion of sunflower protein products. 0.2 g samples of protein product were dispersed in 20 g of a 10 mM sodium phosphate buffer after which the solution pHs were adjusted to 3, 5 and 7 with 85% $H_3PO_4$ or 50% NaOH, followed by vortexing for 3 min. After vortexing, the Foam Volumes ($FV_0$) were measured to give foam capacity (FC), calculated by the following equation:

$$FC = \frac{V_{F0}}{V_{sample}} \times 100\%$$

The foaming capacity for various products is shown in Table 19.

TABLE 19

Foaming Capacity

| Product | Foaming Capacity (%) | | |
|---|---|---|---|
| | pH 3 | pH 5 | pH 7 |
| 171 | 5.0 | 0 | 0 |
| 236 | 11.3 | 10.0 | 12.5 |
| 241 | 62.5 | 110 | 120 |
| 246 | 100 | 120 | 120 |

The Foaming Stabilities (FS) were calculated by followed equation:

$$FS = \frac{V_{F30}}{V_{F0}} \times 100\%$$

where $FV_0$ is the foam volume at to after foaming and $FV_{30}$ is the foam volume at t=30 min. The foaming capacity of a protein is measured as the amount of interfacial area that can be created by vortexing the protein solution. Foam stability is measured as the time required to lose either x % of the volume from the foam.

The foaming stability for various products is shown in Table 20.

TABLE 20

Foaming Stability

| Product | Foaming Stability (%) | | |
|---|---|---|---|
| | pH 3 | pH 5 | pH 7 |
| 171 | 0 | — | — |
| 236 | 100 | 50.0 | 80.0 |
| 241 | 94.1 | 88.6 | 93.8 |
| 246 | 80.0 | 93.8 | 76.0 |

Example 9—Color

This Example illustrates the colorimetric characterization of the sunflower protein products prepared according to the present disclosure as described in Examples 2 and 3. L* is normalized to the values 0 to 100, corresponding to a percentage scale which describes the lightness of a sample. L*=100% means 100% light and L*=0 means no light (black). Positive a* values represent reddish tones and negative values greenish tones. A more positive a* value indicates the tone is more reddish. A more negative a* value indicates the tone is more greenish. Positive b* values represent yellowish tones and negative b* values represent blueish tones. A more positive b* value indicates the tone is more yellowish. A more negative b* value indicates the tone is more blueish. The color measurements of each sample were captured by a Spectro 1™ colorimeter device (available from Variable Inc., Chattanooga, TN, USA) by pointing the device at a container containing a sample and then recording the color of the target sample.

The color characteristics for various products are shown in Table 21.

TABLE 21

Color

| Product | L* | a* | b* |
|---|---|---|---|
| 236 | 40.4 | −4.5 | 9.3 |
| 241 | 55.9 | −3.0 | 11.6 |
| 436 | 67.3 | −2.9 | 7.1 |
| 441 | 67.1 | −0.8 | 10.8 |

The invention claimed is:

1. A sunflower extract protein composition comprising from about 65% (w/w) to about 80% (w/w) sunflower protein, from about 1% (w/w) to about 12% (w/w) sunflower plant oil, and from about 5% (w/w) to about 15% (w/w) sunflower carbohydrates, wherein the sunflower extract protein composition is a sunflower protein concentrate.

2. The sunflower extract protein composition according to claim 1, wherein the sunflower extract protein composition comprises a total content of the sunflower protein and the sunflower plant oil of at least about 69% (w/w).

3. The sunflower extract protein composition according to claim 1, wherein the sunflower extract protein composition comprises a total content of the sunflower protein and the sunflower plant oil of from about 68% (w/w) to about 70% (w/w).

4. The sunflower extract protein composition according to claim 1, wherein the sunflower extract protein composition comprises a total content of the sunflower protein and the sunflower plant oil of from about 66% (w/w) to about 91% (w/w).

5. The sunflower extract protein composition according to claim 1, wherein a ratio of the sunflower protein to the sunflower plant oil is at least about 5.5:1 on a weight-by-weight basis.

6. The sunflower extract protein composition according to claim 1, wherein a ratio of the sunflower protein to the sunflower plant oil is from about 5.5:1 to about 66:1 on a weight-by-weight basis.

7. The sunflower extract protein composition according to claim 1, wherein a weight percentage of essential amino acids in the sunflower extract protein composition is from about 30% (w/w) to about 36% (w/w) by weight of crude protein of the sunflower extract protein composition.

8. The sunflower extract protein composition according to claim 1, wherein a weight percentage of essential amino acids in the sunflower extract protein composition is about 29% (w/w) or more by weight of crude protein of the sunflower extract protein composition.

9. The sunflower extract protein composition according to claim 1, wherein a lysine content is up to about 4.4% by weight of crude protein of the sunflower extract protein composition.

10. The sunflower extract protein composition according to claim 1, wherein a lysine content is from about 3.0% to about 5.2% by weight of crude protein of the sunflower extract protein composition.

* * * * *